(12) United States Patent  
Fujimoto et al.

(10) Patent No.: US 9,100,244 B2
(45) Date of Patent: Aug. 4, 2015

(54) REGISTRATION METHOD AND REGISTRATION APPARATUS

(75) Inventors: Shingo Fujimoto, Yokohama (JP); Kazuki Matsui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 402 days.

(21) Appl. No.: 13/609,432

(22) Filed: Sep. 11, 2012

(65) Prior Publication Data
US 2013/0110991 A1 May 2, 2013

(30) Foreign Application Priority Data

Oct. 31, 2011 (JP) ................................. 2011-239761

(51) Int. Cl.
H04L 9/32 (2006.01)
H04L 29/06 (2006.01)
(52) U.S. Cl.
CPC ............................. H04L 29/06333 (2013.01)
(58) Field of Classification Search
CPC ....... H04L 63/08; H04W 12/04; H04W 12/06
USPC ......................................... 709/220; 713/168
See application file for complete search history.

(56) References Cited

U.S. PATENT DOCUMENTS

| | | | |
|---|---|---|---|
| 7,350,077 B2 * | 3/2008 | Meier et al. ................... | 713/171 |
| 8,898,453 B2 * | 11/2014 | Preiss et al. ................... | 713/155 |
| 2004/0103282 A1 * | 5/2004 | Meier et al. ................... | 713/171 |
| 2006/0248342 A1 * | 11/2006 | Bajar et al. ................... | 713/182 |
| 2007/0022469 A1 * | 1/2007 | Cooper et al. ................... | 726/3 |
| 2007/0286369 A1 * | 12/2007 | Gutt et al. ................ | 379/127.01 |
| 2008/0002684 A1 * | 1/2008 | Kumazawa et al. .......... | 370/389 |
| 2010/0202450 A1 * | 8/2010 | Ansari et al. ................... | 370/389 |
| 2010/0217837 A1 * | 8/2010 | Ansari et al. ................... | 709/218 |
| 2011/0271099 A1 * | 11/2011 | Preiss et al. ................... | 713/155 |
| 2011/0271110 A1 * | 11/2011 | Ohba et al. ................... | 713/168 |
| 2012/0209951 A1 * | 8/2012 | Enns et al. ................... | 709/217 |
| 2014/0032759 A1 * | 1/2014 | Barton et al. ................. | 709/225 |
| 2014/0040979 A1 * | 2/2014 | Barton et al. ................... | 726/1 |
| 2014/0337528 A1 * | 11/2014 | Barton et al. ................. | 709/225 |

FOREIGN PATENT DOCUMENTS

| | | |
|---|---|---|
| JP | 2004-102879 | 4/2004 |
| JP | 2010-226456 | 10/2010 |

* cited by examiner

*Primary Examiner* — Kevin Bates
*Assistant Examiner* — Clarence D McCray
(74) *Attorney, Agent, or Firm* — Staas & Halsey LLP

(57) ABSTRACT

A computer receives, from a target device via a communication apparatus that is capable of accessing the target device, an issuance request for issuing key information unique to the target device. The computer generates the key information upon reception of the issuance request. The computer stores an address allocated to the communication apparatus and the key information in association with each other. The computer transmits the key information to the target device via the communication apparatus. The computer receives, from the communication apparatus, the key information and a registration request for registering a relay apparatus for relaying communication between the computer and the target device. The computer registers the communication apparatus as the relay apparatus when the address allocated to the communication apparatus and the address stored in association with the received key information match each other.

7 Claims, 26 Drawing Sheets

REGISTRATION METHOD AND REGISTRATION APPARATUS

CROSS-REFERENCE TO RELATED APPLICATION

This application is based upon and claims the benefit of priority of the prior Japanese Patent Application No. 2011-239761, filed on Oct. 31, 2011, the entire contents of which are incorporated herein by reference.

FIELD

The embodiment discussed herein is related to a registration method and a registration apparatus.

BACKGROUND

In recent years, remote management, such as controlling a device and collecting measurement data from a device, through a network has become possible using technologies such as an OMA-DM (open mobile alliance-device management).

For remote management of a home device, direct access from an external apparatus, such as a management server, to the home device is disabled in many cases in terms of security and cost. Thus, there are cases in which the remote management of the home device is performed via a gateway apparatus for relaying communication between the management server and the home device.

As a related art, a technology is proposed in which, during network communication, an IC (integrated circuit) card having an IC card ID (identifier) constituted by a user address and a SA (security association) is used to simultaneously transmit user authentication information and a user address for login processing. Another technology is also proposed in which access to a home device placed in an end-user home is controlled.

Japanese Laid-open Patent Publication No. 2004-102879 and Japanese Laid-open Patent Publication No. 2010-226456 disclose related techniques.

In the related art, however, there is a problem in that it is difficult to authenticate a gateway apparatus for relaying communication between a device to be remotely managed and an external apparatus such as a management server. Consequently, there are problems in that, for example, a gateway apparatus used by a malicious user fraudulently controls the device or causes leakage of data collected from the device.

SUMMARY

According to an aspect of the present invention, provided is a registration method executed by a computer. The computer receives, from a target device via a communication apparatus that is capable of accessing the target device, an issuance request for issuing key information unique to the target device. The computer generates the key information upon reception of the issuance request. The computer stores an address and the key information in association with each other. The address is allocated to the communication apparatus that is a transmission source of the issuance request. The computer transmits the key information to the target device via the communication apparatus. The computer receives a registration request and the key information from the communication apparatus as a result of the transmission of the key information to the target device. The registration request is for registering a relay apparatus for relaying communication between the computer and the target device. The computer registers the communication apparatus as the relay apparatus when the address allocated to the communication apparatus that is a transmission source of the received registration request and the address stored in association with the received key information match each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

A registration method and a registration apparatus according to an embodiment will be described below in detail with reference to the accompanying drawings. Herein, the registration apparatus corresponds to a first communication apparatus that is accessible to a target device through a second communication apparatus.

Example of Registration Method

Figure 1:
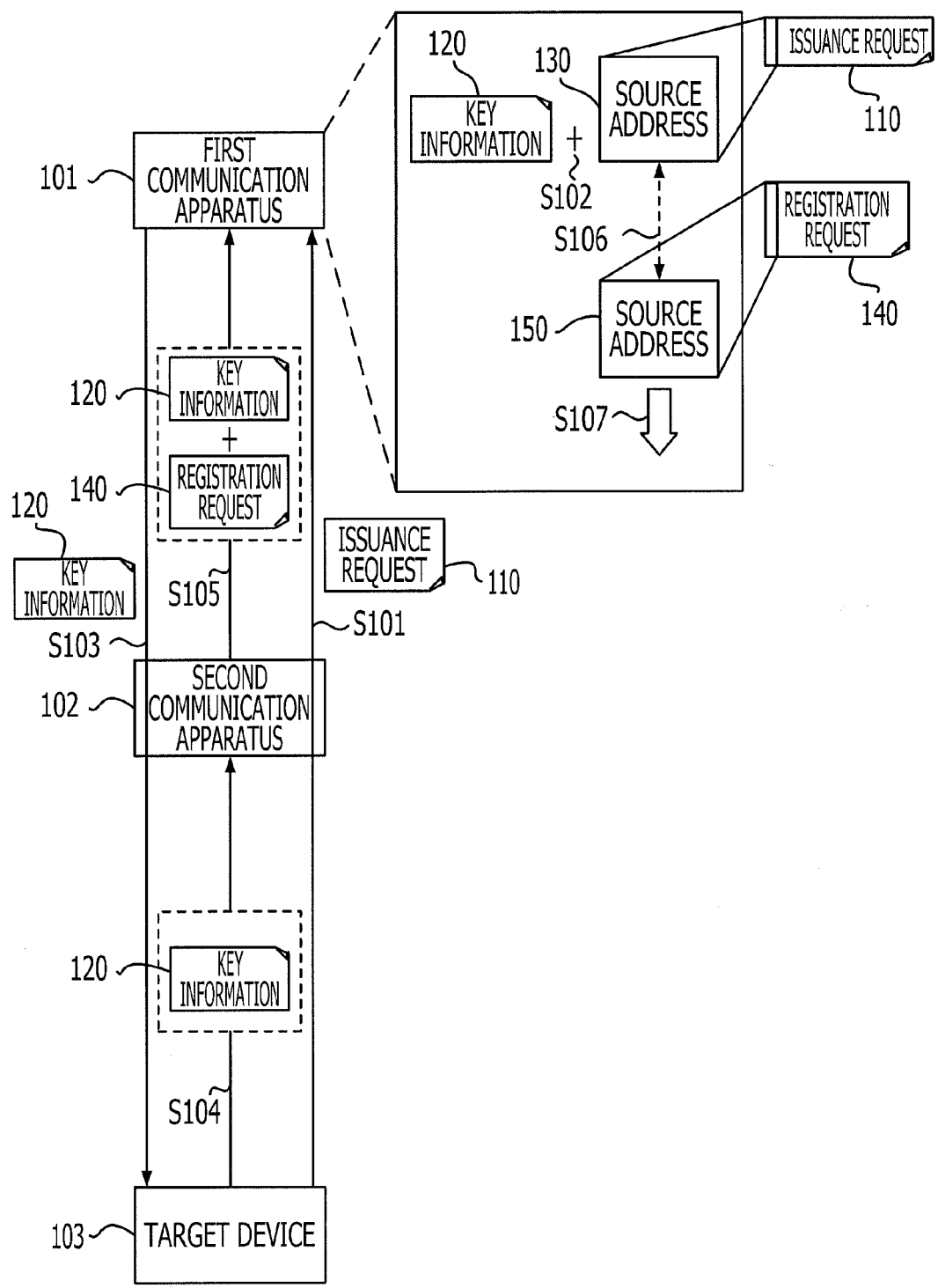
FIG. 1 illustrates an example of a registration method according to an embodiment.

FIG. 1 illustrates an example of a registration method according to the present embodiment. In FIG. 1, a first communication apparatus 101 may be a computer that is accessible to a target device 103 via a second communication apparatus 102. The second communication apparatus 102 may be a computer having a function for relaying communication between the first communication apparatus 101 and the target device 103. The target device 103 may be a computer that is accessible to the first communication apparatus 101 via the second communication apparatus 102. This system features that, during communication from the target device 103 to the first communication apparatus 101 via the second communication apparatus 102, contents of the communication may be concealed from the second communication apparatus 102 but an address of the second communication apparatus 102 may be used as a source address of the communication. The second communication apparatus 102 may also respond to a communication initiated by the first communication apparatus 101.

Now, it is assumed that the first communication apparatus 101 performs remote management, such as controlling the target device 103 and collecting data from the target device 103, via the second communication apparatus 102. In this case, for example, when the second communication apparatus 102 is used by a malicious user, the target device 103 may be fraudulently controlled or data collected from the target device 103 may be leaked.

Accordingly, a registration method for authenticating the second communication apparatus 102 that relays a communication between the first communication apparatus 101 and the target device 103 will be described in the present embodiment.

In S101, the first communication apparatus 101 receives, from the target device 103 via the second communication apparatus 102, an issuance request 110 for issuing key information unique to the target device 103. That is, the issuance request 110 addressed to the first communication apparatus 101 is transmitted from the target device 103 and is then transferred from the second communication apparatus 102 to the first communication apparatus 101. The key information is to identify the request source of the issuance request 110. The key information is randomly generated each time the issuance request is received and may be represented by, for example, characters, numerals, symbols, or a combination of any of characters, numerals, and symbols.

In S102, upon receiving the issuance request 110, the first communication apparatus 101 generates key information 120 unique to the target device 103 and stores a source address 130 of the issuance request 110 and the key information 120 in association with each other. In this case, the source address 130 is an address assigned to the second communication apparatus 102 that is the transmission source of the issuance request 110. The source address 130 may be, for example, an IP (internet protocol) address for identifying the second communication apparatus 102 in an IP network.

In S103, the first communication apparatus 101 transmits the key information 120 to the target device 103 via the second communication apparatus 102. More specifically, for example, the first communication apparatus 101 transmits the key information 120 to the target device 103 via the second communication apparatus 102 as an issuance response to the received issuance request 110.

In S104, upon receiving the key information 120 from the first communication apparatus 101, the target device 103 stores the key information 120 and transmits the key information 120 to the second communication apparatus 102.

In S105, upon receiving the key information 120 from the target device 103, the second communication apparatus 102 stores the key information 120 and transmits the key information 120 and a registration request 140 to the first communication apparatus 101. The registration request 140 is to request registration of a relay apparatus for relaying communication between the first communication apparatus 101 and the target device 103.

In S106, upon receiving the key information 120 and the registration request 140 from the second communication apparatus 102, the first communication apparatus 101 determines whether or not a source address 150 of the registration request 140 and the source address 130 stored in association with the key information 120 match each other. The key information 120 may be contained in the registration request 140.

In S107, when the source address 130 and the source address 150 match each other, the first communication apparatus 101 registers the second communication apparatus 102 as the relay apparatus for relaying a communication request from the first communication apparatus 101 to the target device 103.

Thus, according to the registration method of the present embodiment, the second communication apparatus 102 that is the transmission source of the registration request 140 may be registered as the relay apparatus, provided that the source address 130 of the issuance request 110, which is stored in association with the key information 120 received together with the registration request 140, matches the source address 150 of the registration request 140. With this arrangement, the second communication apparatus 102 may be authenticated without use of a complex algorithm for a cryptographic technology or the like and a procedure for secure authentication may be simplified.

More specifically, the first communication apparatus 101 may determine the identity between the transmission source of the issuance request 110 and the transmission source of the registration request 140, based on the address allocated to the second communication apparatus 102. In addition, based on the key information 120 transmitted together with the registration request 140, the first communication apparatus 101 may also authenticate the second communication apparatus 102, which is the transmission source of the registration request 140, as a communication apparatus that has received a relay request from the target device 103.

In other words, the first communication apparatus 101 authenticates the second communication apparatus 102 that transfers the issuance request 110 issued from the target device 103 and then authenticates the second communication apparatus 102 that transmits the registration request 140 whose source address 150 matches the source address 130 of the issuance request 110. With this arrangement, for example, it is possible to determine that one communication apparatus that has no key information 120 has not received a relay request from the target device 103. Even if one communication apparatus has the key information 120, when the source address of the registration request 140 is different from the source address of the issuance request 110, it is possible to determine that the communication apparatus that is the transmission source of the registration request 140 has not received a relay request from the target device 103.

The issuance request 110 may also contain identification information of the target device 103 and authentication data for authenticating the target device 103 (details of such an arrangement will be described later). The authentication data for the target device 103 is, for example, information pre-shared by the first communication apparatus 101 and the target device 103. In this case, based on the authentication data for the target device 103, which is contained in the issuance request 110, the first communication apparatus 101 may further authenticate that the original source of the issuance request 110 is the target device 103.

Exemplary System Configuration of Communication System

Figure 2:
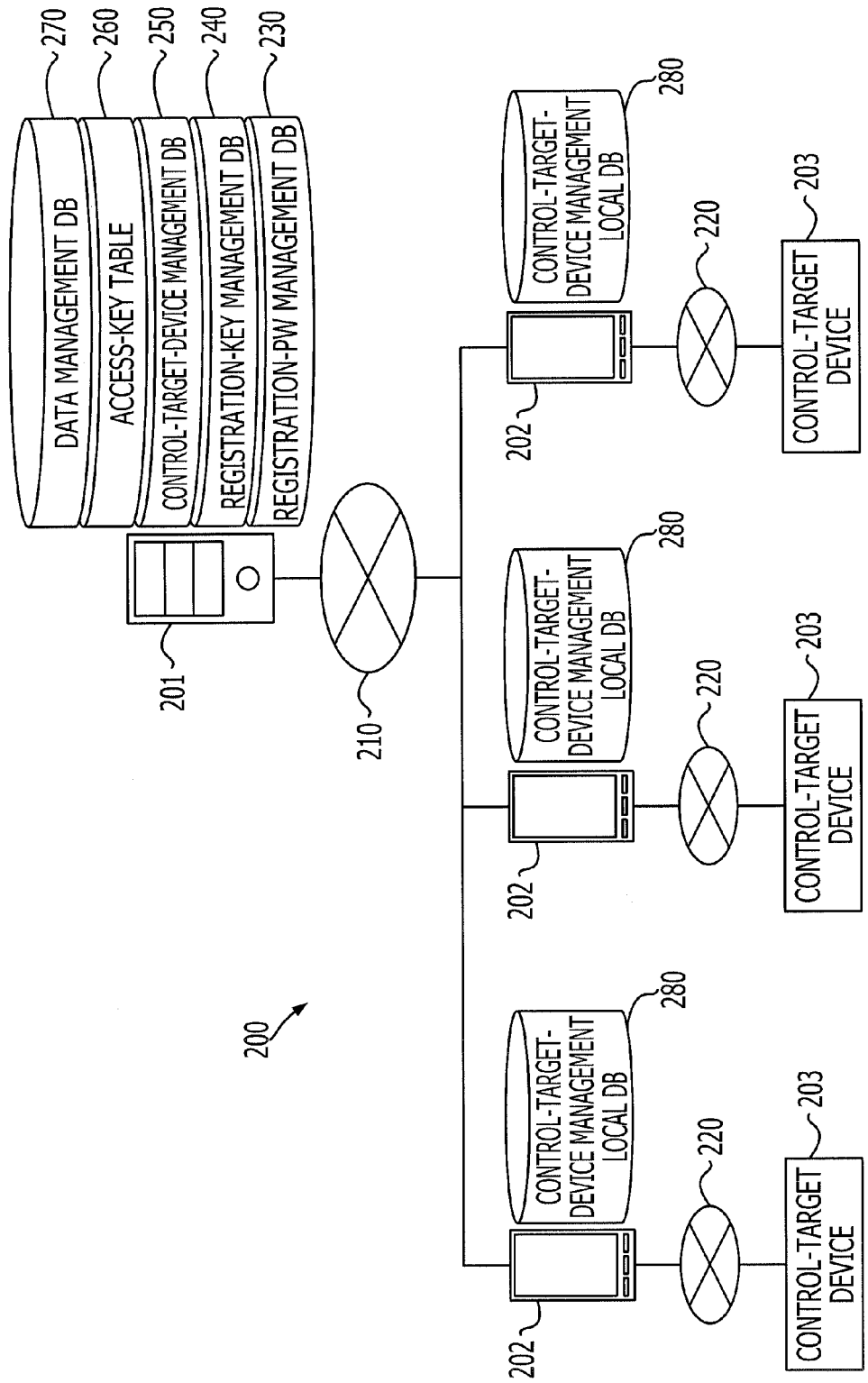
FIG. 2 illustrates an exemplary system configuration of a communication system.

Next, a description will be given of an exemplary system configuration of a communication system according to the present embodiment. FIG. 2 illustrates an exemplary system configuration of a communication system 200. In FIG. 2, the communication system 200 includes a control server 201, multiple gateway apparatuses 202, and multiple control-target devices 203.

The control server 201 and the gateway apparatuses 202 in the communication system 200 are communicably connected through a wired or wireless network 210. Examples of the network 210 include a LAN (local area network), a WAN (wide area network), and the Internet. The gateway apparatuses 202 and the control-target devices 203 are also communicably connected through respective wired or wireless networks 220. Examples of the networks 220 include wireless LANs and infrared communication links.

The control server 201 may be a computer that controls the control-target devices 203 and collects data from the control-target devices 203 via the corresponding gateway apparatuses 202. More specifically, for example, using the OMA-DM technology, the control server 201 performs remote management of the control-target devices 203 via the gateway apparatuses 202.

The control server 201 has a registration-PW (password) management DB (database) 230, a registration-key management DB 240, a control-target-device management DB 250, an access-key table 260, and a data management DB 270, which will be described later in detail with reference to FIGS. 6 to 10. The control server 201 corresponds to, for example, the first communication apparatus 101 illustrated in FIG. 1.

A gateway apparatus 202 may be a computer having a function for relaying communication between the control server 201 and a control-target device 203. Examples of the gateway apparatus 202 include a smart phone, a tablet PC (personal computer), a mobile phone, a PHS (personal handy-phone system) phone, a PC, and a wireless-LAN access point.

Each gateway apparatus 202 has a control-target-device management local DB 280. A detailed description of the control-target-device management local DB 280 will be given later with reference to FIG. 11. The gateway apparatus 202 corresponds to, for example, the second communication apparatus 102 illustrated in FIG. 1.

A control-target device 203 may be a computer to be remotely managed. Examples of the control-target device 203 include a health scale, a sphygmomanometer, a television set, a video recorder, a music player, an air conditioner, a refrigerator, a camera, and any type of sensor (e.g., a temperature sensor). The control-target device 203 corresponds to, for example, the target device 103 illustrated in FIG. 1.

A registration PW for authenticating the corresponding control-target device 203 is set for the control-target device 203. The registration PW is information shared by the control server 201 and the corresponding control-target device 203. The registration PW may be set, for example, when the control-target device 203 is shipped from a factory or may be manually set by a purchaser of the control-target device 203.

The control-target device 203 is accessible to the control server 201 via the corresponding gateway apparatus 202, for example, by using a NAT (network address translation) technology or the like. That is, in the communication system 200, although the control server 201 is not allowed to initiate a communication with the control-target device 203, the control-target device 203 may initiate a communication with the control server 201 by using a NAT function of the corresponding gateway apparatus 202.

Exemplary Hardware Configuration of Control Server 201

Figure 3:
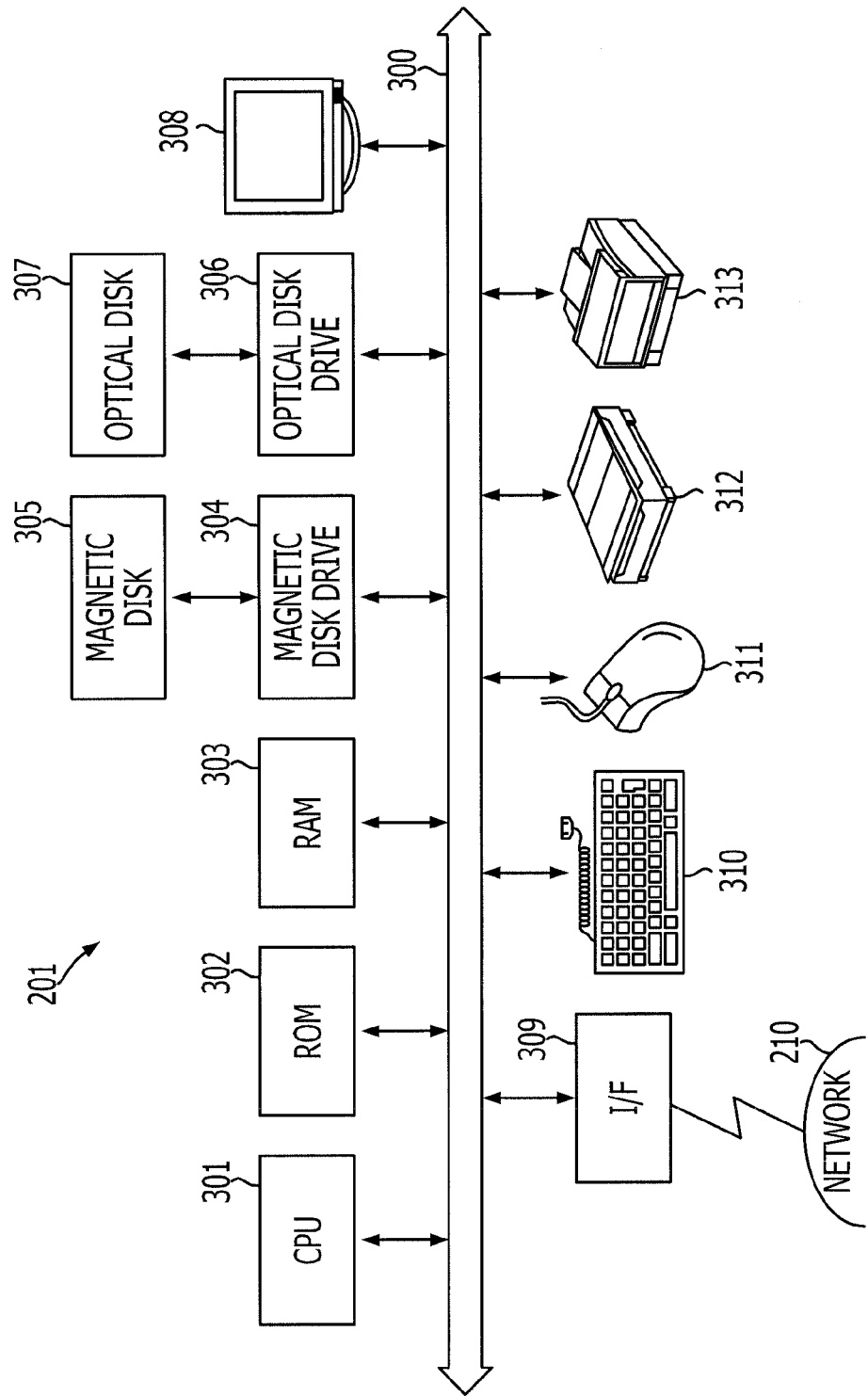
FIG. 3 is a block diagram illustrating an exemplary hardware configuration of a control server.

Next, a description will be given of an exemplary hardware configuration of the control server 201 according to the present embodiment. FIG. 3 is a block diagram illustrating an exemplary hardware configuration of the control server 201. As illustrated in FIG. 3, the control server 201 includes a CPU (central processing unit) 301, a ROM (read-only memory) 302, a RAM (random access memory) 303, a magnetic disk drive 304, a magnetic disk 305, an optical disk drive 306, an optical disk 307, a display 308, an interface (I/F) 309, a keyboard 310, a mouse 311, a scanner 312, and a printer 313. Those elements are interconnected through a bus 300.

The CPU 301 controls the overall control server 201. Programs, such as a boot program, are stored in the ROM 302. The RAM 303 may be used as a work area for the CPU 301. Under the control of the CPU 301, the magnetic disk drive 304 controls writing/reading of data to/from the magnetic disk 305. Data written under the control of the magnetic disk drive 304 is stored on the magnetic disk 305.

Under the control of the CPU 301, the optical disk drive 306 controls writing/reading of data to/from the optical disk 307. Data written under the control of the optical disk drive 306 is stored on the optical disk 307. Data stored on the optical disk 307 may be read by a computer.

The display 308 displays, for example, a cursor, icons, and toolboxes, and data such as documents, images, and function information. Examples of the display 308 include a CRT (cathode ray tube) display, a TFT (thin film transistor) liquid crystal display, and a plasma display.

The interface 309 is connected with the network 210 through a communications line and is connected with an external apparatus (e.g., the gateway apparatus 202) through the network 210. The interface 309 interfaces between the network 210 and the internal elements to control output/input of data to/from the external apparatus. The interface 309 may be implemented by, for example, a modem or a LAN adapter.

The keyboard 310 is used to input data and has keys for inputting characters, numerals, various instructions, and so on. The keyboard 310 may also be implemented by a touch-panel input pad, a numerical keypad, or the like. The mouse 311 may be used to move a cursor, select an area, move a window, or change the size of the window. Any pointing device having functions similar to those described above may also be used. Examples include a trackball and a joystick.

The scanner 312 optically reads an image and captures image data into the control server 201. The scanner 312 may also have an OCR (optical character reader) function. The printer 313 prints image data and document data. The printer 313 may also be implemented by, for example, a laser printer or an inkjet printer. The control server 201 may or may not have, for example, the optical disk drive 306, the optical disk 307, the scanner 312, and the printer 313 of the above-described elements.

Exemplary Hardware Configuration of Gateway Apparatus 202

Figure 4:
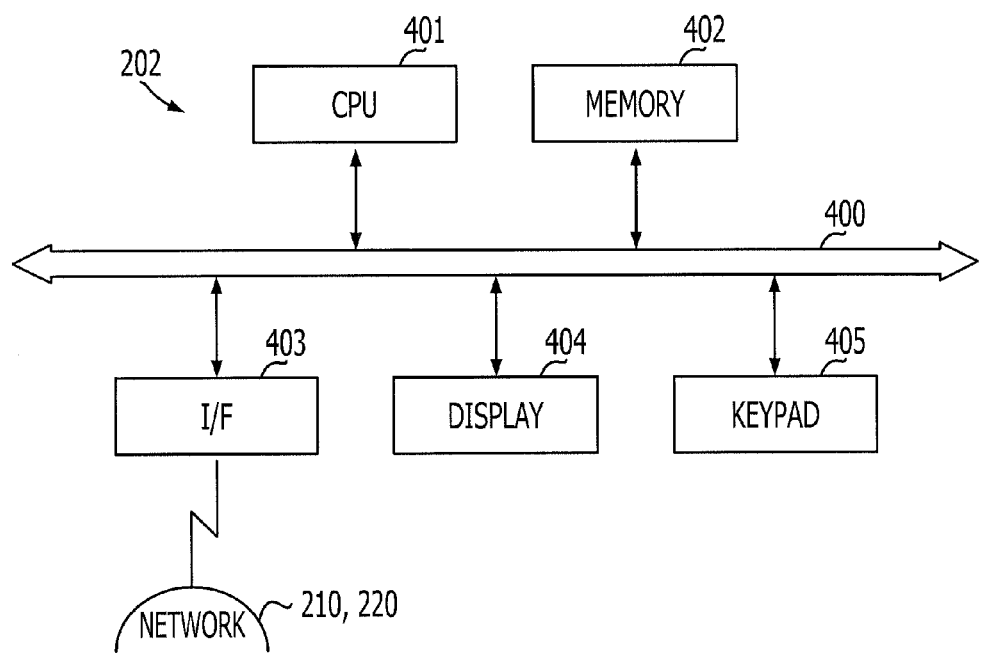
FIG. 4 is a block diagram illustrating an exemplary hardware configuration of a gateway apparatus.

Next, a description will be given of an exemplary hardware configuration of the gateway apparatus 202 according to the present embodiment. FIG. 4 is a block diagram illustrating an exemplary hardware configuration of the gateway apparatus 202. As illustrated in FIG. 4, the gateway apparatus 202 includes a CPU 401, a memory 402, an interface (I/F) 403, a display 404, and a keypad 405. Those elements are interconnected through a bus 400.

The CPU 401 controls the overall gateway apparatus 202. The memory 402 includes, for example, a ROM, a RAM, and a flash ROM. More specifically, for example, the flash ROM stores an OS (operating system) program, the ROM stores an application program, and the RAM is used as a work area for the CPU 401.

The interface 403 is connected with the networks 210 and 220 through corresponding communications lines and is connected with external apparatuses (e.g., the control server 201 and the control-target device 203) through the networks 210 and 220. The interface 403 interfaces between the network 210 or 220 and the internal elements to control output/input of data to/from the external apparatuses.

The display 404 displays, for example, a cursor, icons, and toolboxes, and data such as documents, images, and function information. The display 404 may be implemented by, for example, a liquid crystal display or an organic EL (electroluminescence) display. The keypad 405 is used to input data and has keys for inputting characters, numerals, various instructions, and so on. The keypad 405 may also be implemented by a touch-panel input pad, a numerical keypad, or the like. The gateway apparatus 202 may have a GPS (global positioning system) unit in addition to the above-described elements.

Exemplary Hardware Configuration of Control-Target Device 203

Figure 5:
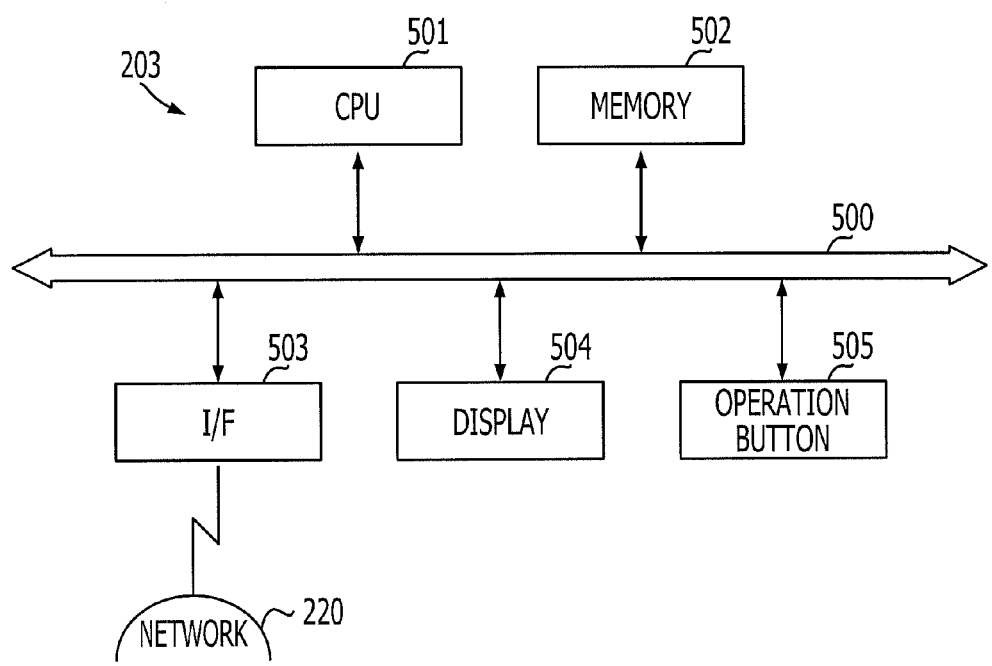
FIG. 5 is a block diagram illustrating an exemplary hardware configuration of a control-target device.

Next, a description will be given of an exemplary hardware configuration of the control-target device 203 according to the present embodiment. FIG. 5 is a block diagram illustrating an exemplary hardware configuration of the control-target device 203. In FIG. 5, the control-target device 203 includes a CPU 501, a memory 502, an interface (I/F) 503, a display 504, and an operation button 505. Those elements are interconnected through a bus 500.

The CPU 501 controls the overall control-target device 203. The memory 502 includes, for example, a ROM, a RAM, and a flash ROM. The interface 503 is connected with the network 220 through a communications line and is connected with an external apparatus (e.g., the gateway apparatus 202) through the network 220. The interface 503 interfaces between the network 220 and the internal elements to control output/input of data to/from the external apparatus.

The display 504 displays, for example, a cursor, icons, and toolboxes, and data such as documents, images, and function information and so on. The display 504 may be implemented by, for example, a liquid crystal display or an organic EL display. The operation button 505 is used to input data and includes buttons for inputting characters, numerals, various instructions, and so on.

Contents Stored in DBs 230, 240, 250, and 270 and Table 260

Next, a description will be given of contents stored in the registration-PW management DB 230, the registration-key management DB 240, the control-target-device management DB 250, the access-key table 260, and the data management DB 270 included in the control server 201. The registration-PW management DB 230, the registration-key management DB 240, the control-target-device management DB 250, the access-key table 260, and the data management DB 270 are implemented by, for example, a storage device, such as the ROM 302, the RAM 303, the magnetic disk 305, or the optical disk 307 illustrated in FIG. 3.

Contents Stored in Registration-PW Management DB 230

Figure 6:
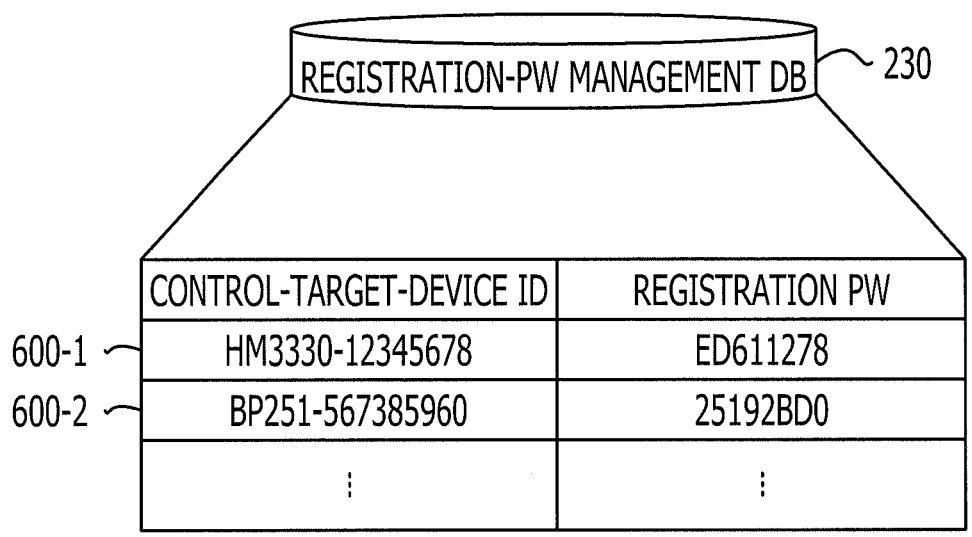
FIG. 6 illustrates an example of contents stored in a registration-PW management DB.

FIG. 6 illustrates an example of contents stored in the registration-PW management DB 230. In FIG. 6, the registration-PW management DB 230 has a "control-target-device ID" field and a "registration PW" field. Pieces of information are entered into the corresponding fields, so that pieces of registration PW information (e.g., registration PW information 600-1 and 600-2) are stored as records.

Each control-target-device ID is identification information for identifying the corresponding control-target device 203. For example, a production number of the control-target device 203 may be used as the control-target-device ID. Each registration PW is authentication data for authenticating the control-target device 203. In the example of the registration PW information 600-1, registration PW "ED611278" of the control-target device 203 with control-target-device ID "HM3330-12345678" is illustrated.

Contents Stored in Registration-Key Management DB 240

Figure 7:
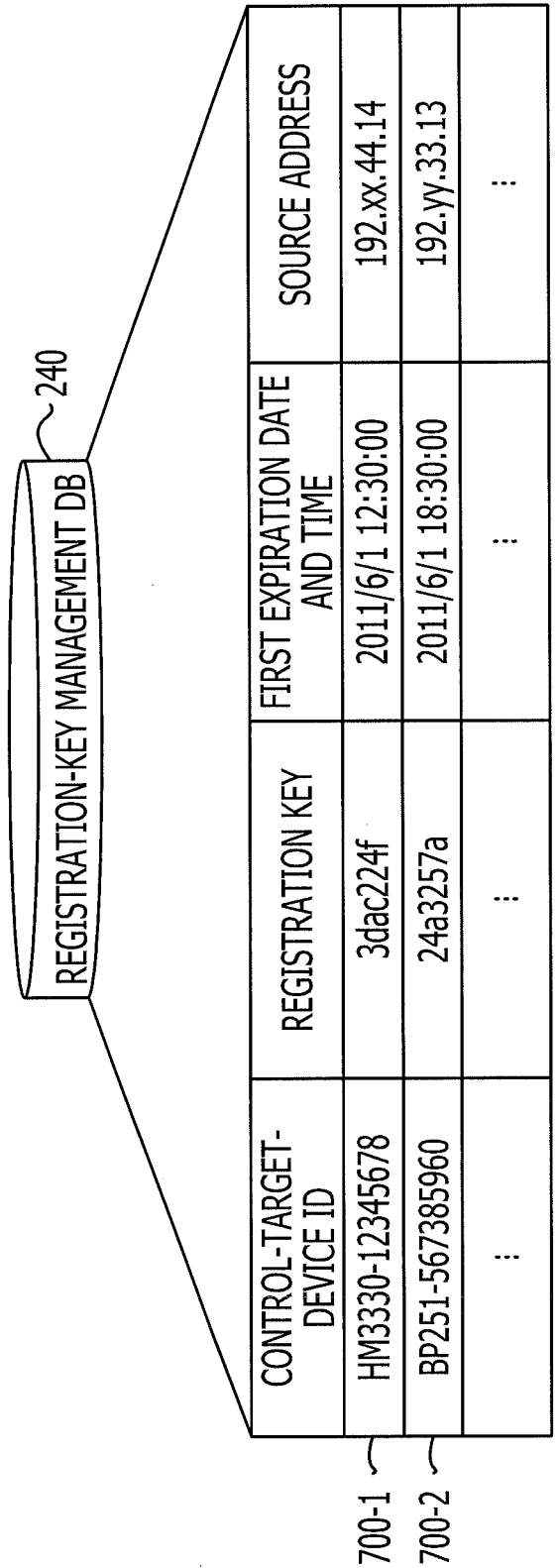
FIG. 7 illustrates an example of contents stored in a registration-key management DB.

FIG. 7 illustrates an example of contents stored in the registration-key management DB 240. In FIG. 7, the registration-key management DB 240 has a "control-target-device ID" field, a "registration key" field, a "first expiration date and time" field, and a "source address" field. Pieces of information are entered into the corresponding fields, so that pieces of registration-key information (e.g., registration-key information 700-1 and 700-2) are stored as records.

Each control-target-device ID is identification information for identifying the corresponding control-target device 203. Each registration key is key information unique to the corresponding control-target device 203. Each registration key corresponds to the key information 120 illustrated in FIG. 1. The first expiration date and time indicates a valid period of the registration key. Specifically, the valid period of the registration key is a period of time from the current time to the first expiration date and time. Each source address is an IP address allocated to the corresponding gateway apparatus 202 that is the transmission source of a registration-key issuance request.

In the example of the registration-key information 700-1, a registration key "3dac224f", first expiration date and time "2011/6/1 12:30:00", and source address "192.xx.44.14" of the control-target device 203 with the control-target-device ID "HM3330-12345678" are illustrated.

Contents Stored in Control-Target-Device Management DB 250

Figure 8:
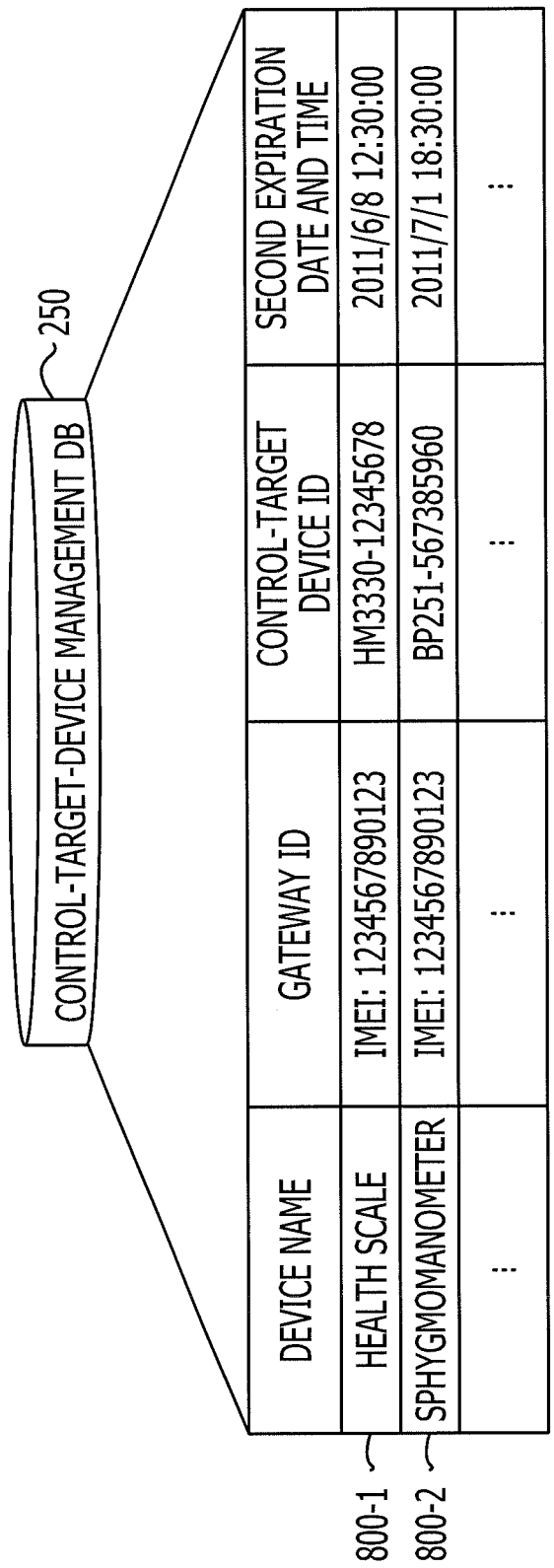
FIG. 8 illustrates an example of contents stored in a control-target-device management DB.

FIG. 8 illustrates an example of contents stored in the control-target-device management DB 250. In FIG. 8, the control-target-device management DB 250 has a "device name" field, a "gateway ID" field, a "control-target device ID" field, and a "second expiration date and time" field. Pieces of information are entered into the corresponding fields, so that pieces of control-target-device information (e.g., control-target-device information 800-1 and 800-2) are stored as records.

Each device name represents the name of the corresponding control-target device 203. Each gateway ID is identification information for identifying the corresponding gateway apparatus 202. The gateway ID may be, for example, an IMEI (international mobile equipment identifier), which is a production number of the gateway apparatus 202. The control-target-device ID is identification information for identifying the corresponding control-target device 203. The second expiration date and time indicates the valid period of an access key, which is key information unique to the gateway apparatus 202. Specifically, the valid period of the access key is a period of time from the current time to the second expiration date and time.

In the example of the control-target-device information 800-1, device name "health scale", gateway ID "IMEI: 1234567890123" of the gateway apparatus 202 registered as the relay apparatus for relaying a communication of the control-target device 203 with the control-target-device ID "HM3330-12345678", and second expiration date and time "2011/6/8 12:30:00" are illustrated.

Contents Stored in Access-Key Table 260

Figure 9:
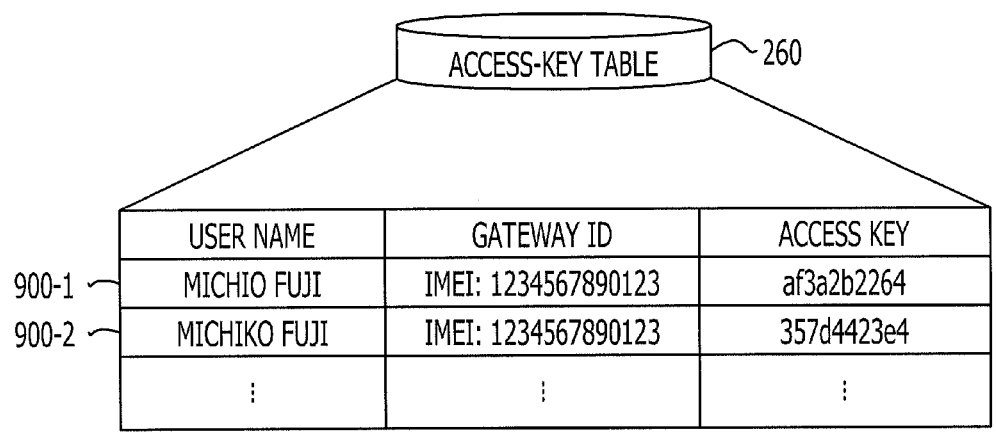
FIG. 9 illustrates an example of contents stored in an access-key table.

FIG. 9 illustrates an example of contents stored in the access-key table 260. In FIG. 9, the access-key table 260 has a "user name" field, a "gateway ID" field, and an "access key" field. Pieces of information are entered into the corresponding fields, so that pieces of access-key information (e.g., access-key information 900-1 and 900-2) are stored as records.

Each user name is the name of a user who uses the corresponding gateway apparatus 202. Each gateway ID is identification information for identifying the corresponding gateway apparatus 202. Each access key is key information unique to the corresponding gateway apparatus 202. In the example of the access-key information 900-1, access key "af3a2b2264" for the gateway apparatus 202 with the gateway ID "IMEI:1234567890123", which is used by a user with user name "Michio Fuji", is illustrated.

Contents Stored in Data Management DB 270

Figure 10:
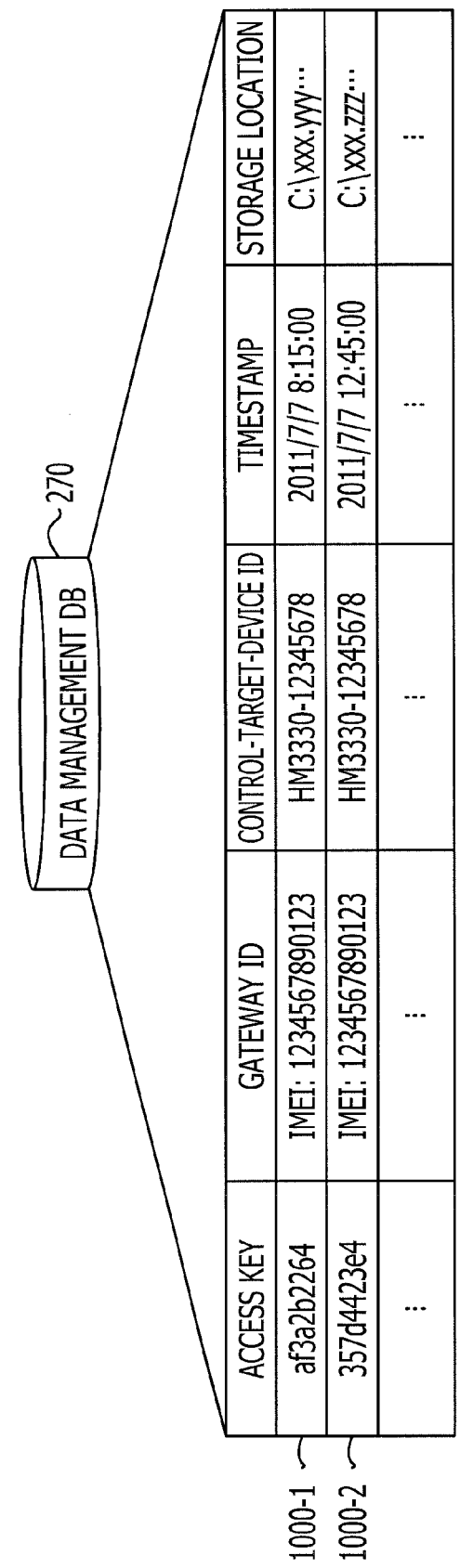
FIG. 10 illustrates an example of contents stored in a data management DB.

FIG. 10 illustrates an example of contents stored in the data management DB 270. In FIG. 10, the data management DB 270 has an "access key" field, a "gateway ID" field, a "control-target-device ID" field, a "timestamp" field, and a "storage location" field. Pieces of information are entered into the corresponding fields, so that pieces of data management information (e.g., data management information 1000-1 and 1000-2) are stored as records.

Each access key is key information unique to the corresponding gateway apparatus 202. Each gateway ID is identification information for identifying the corresponding gateway apparatus 202. Each control-target-device ID is identification information for identifying the corresponding control-target device 203. Each timestamp represents the date and time of reception of data collected from the corresponding control-target device 203. Each storage location represents information for identifying a storage area in which the collected data is stored.

In the example of the data management information 1000-1, management information for data collected via the gateway apparatus 202 with access key "af3a2b2264" and gateway ID "IMEI:1234567890123" is illustrated. Specifically, timestamp "2011/7/7 8:15:00" and storage location "C:\xxx. yyy . . ." of data collected from the control-target device 203 with the control-target-device ID "HM3330-12345678" are illustrated.

Contents Stored in Control-Target-Device Management Local DB 280

Next, a description will be given of contents stored in the control-target-device management local DB 280 included in the gateway apparatus 202. The control-target-device management local DB 280 may be implemented by, for example, the memory 402 illustrated in FIG. 4.

Figure 11:
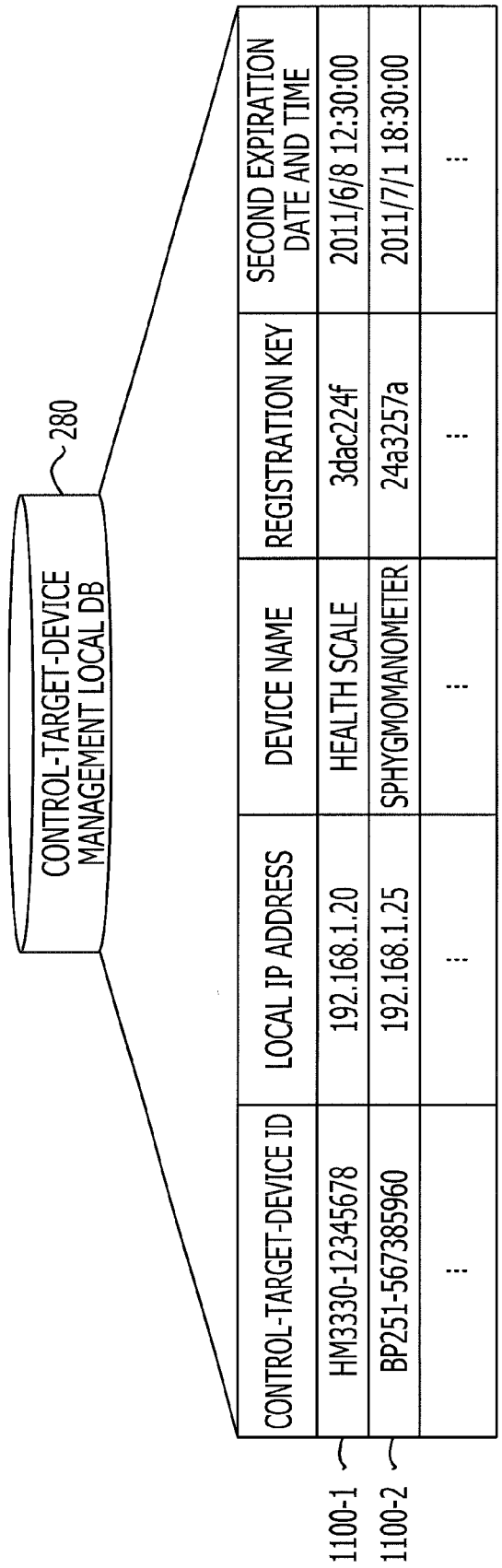
FIG. 11 illustrates an example of contents stored in a control-target-device management local DB.

FIG. 11 illustrates an example of contents stored in the control-target-device management local DB 280. In FIG. 11, the control-target-device management local DB 280 has a "control-target-device ID" field, a "local IP address" field, a "device name" field, a "registration key" field, and a "second expiration date and time" field. Pieces of information are entered into the corresponding fields, so that pieces of control-target-device information (e.g., control-target-device information 1100-1 and 1100-2) are stored as records.

Each control-target-device ID is identification information for identifying the corresponding control-target device 203. Each local IP address is an IP address allocated to the corresponding control-target device 203 and serves as a local address used for communication between the gateway apparatus 202 and the control-target device 203. Each device name represents the name of the corresponding control-target device 203. Each registration key is key information unique to the corresponding control-target device 203. Each second expiration date and time indicates the valid period of the access key unique to the gateway apparatus 202.

Exemplary Operation Sequence of Communication System 200

Next, a description will be given of an exemplary operation sequence of the communication system 200. First, a description will be given of an exemplary operation sequence of registration processing for registering a relay apparatus for relaying communication between the control server 201 and the control-target device 203.

Figure 12:
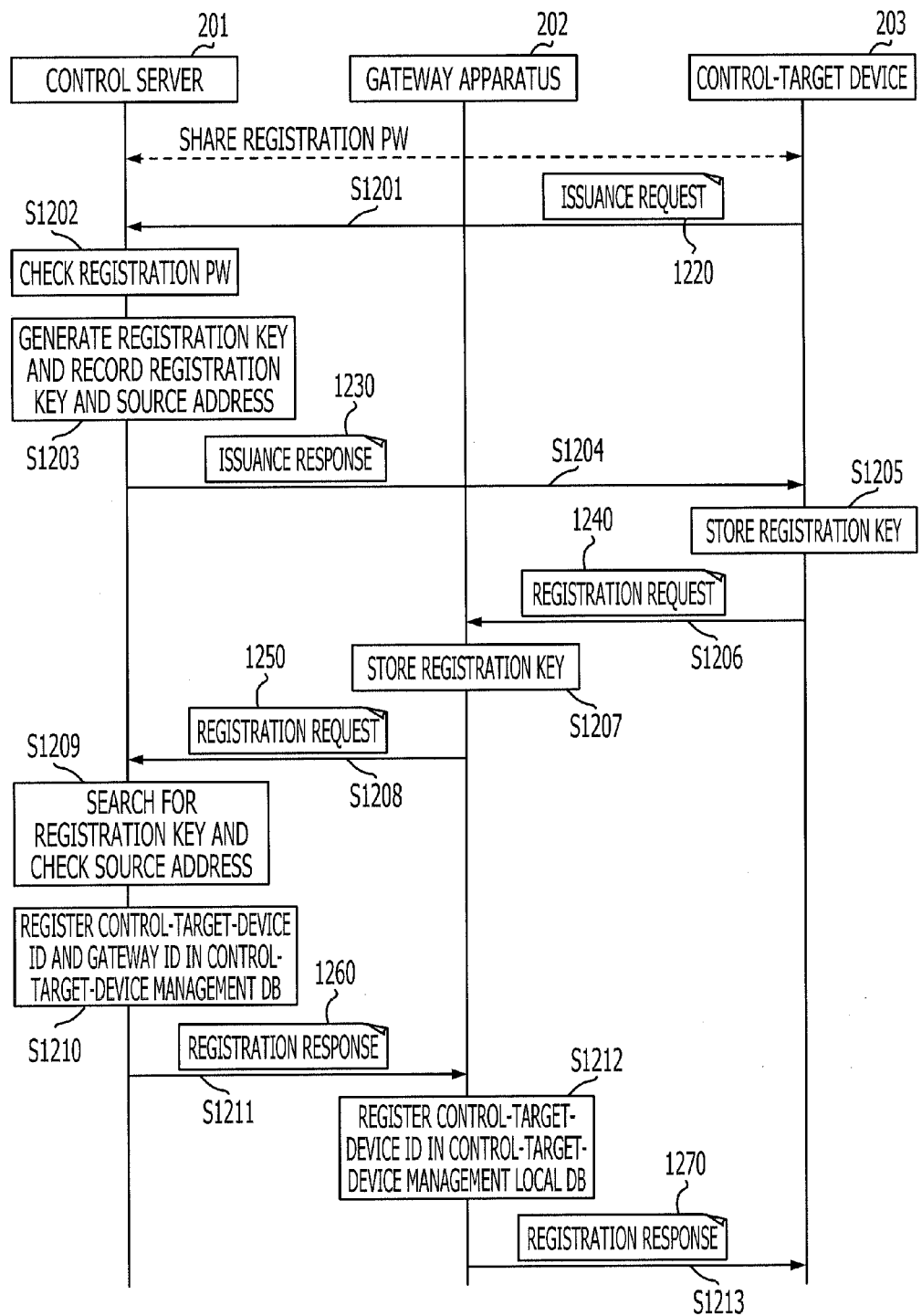
FIG. 12 is a sequence diagram illustrating an example of a registration processing procedure of the communication system.

FIG. 12 is a sequence diagram illustrating an example of a registration processing procedure of the communication system 200. This example is based on the premise that the registration PW for authenticating the control-target device 203 is shared by the control server 201 and the control-target device 203.

In S1201, the control-target device 203 transmits, to the control server 201 via the gateway apparatus 202, an issuance request 1220 for issuing a registration key unique to the control-target device 203. More specifically, for example, upon accepting an instruction for requesting issuance of a registration key, the control-target device 203 transmits the issuance request 1220 to the control server 201.

For example, a user may directly input the issuance-requesting instruction to the control-target device 203 by an input operation using the operation button 505 illustrated in FIG. 5. Upon detecting the control-target device 203 with which the gateway apparatus 202 may communicate, the gateway apparatus 202 may transmit the issuance-requesting instruction to the control-target device 203.

The issuance request 1220 contains the control-target-device ID of the control-target device 203 and the registration PW set for the control-target device 203. The issuance request 1220 is transmitted, for example, as an HTTP (hypertext transfer protocol) request message. A specific example of the issuance request 1220 will be described later with reference to FIG. 13.

In S1202, by referring to the registration-PW management DB 230 illustrated in FIG. 6, the control server 201 checks the registration PW contained in the received issuance request 1220. More specifically, for example, the control server 201 determines whether or not the registration PW stored in the registration-PW management DB 230 and associated with the control-target-device ID contained in the issuance request 1220 matches the registration PW contained in the issuance request 1220. A case in which the registration PWs match each other will be described in this example.

In S1203, the control server 201 generates a registration key unique to the control-target device 203 and records the registration key and the source address of the issuance request 1220 to the registration-key management DB 240 (illustrated in FIG. 7) in association with each other. The source address of the issuance request 1220 is, for example, the IP address allocated to the corresponding gateway apparatus 202 that is the transmission source of the issuance request 1220.

In S1204, the control server 201 transmits, to the control-target device 203 via the gateway apparatus 202, an issuance response 1230 containing the generated registration key unique to the control-target device 203. The issuance response 1230 is transmitted, for example, as an HTTP response message. A specific example of the issuance response 1230 will be described later with reference to FIG. 14.

In S1205, the control-target device 203 stores, in the memory 502, the registration key contained in the received issuance response 1230.

In S1206, the control-target device 203 transmits, to the gateway apparatus 202, a registration request 1240 for requesting registration of a relay apparatus for relaying communication between the control server 201 and the control-target device 203. The registration request 1240 contains the control-target-device ID of the control-target device 203 and the registration key unique to the control-target device 203. The registration request 1240 may be transmitted, for example, as an HTTP request message.

In S1207, the gateway apparatus 202 stores, in the memory 402, the registration key contained in the received registration request 1240.

In S1208, the gateway apparatus 202 transmits, to the control server 201 a registration request 1250 for requesting registration of the relay apparatus for relaying communication between the control server 201 and the control-target device 203.

The registration request 1250 contains the control-target-device ID that the gateway apparatus 202 uses to identify the control-target device 203, the gateway ID of the gateway apparatus 202, and the registration key unique to the control-target device 203. The registration request 1250 is transmitted, for example, as an OMA-DM message (e.g., a DM-device registration alert transmission). The registration request 1250 is created based on the registration request 1240 transmitted from the control-target device 203. A specific example of the registration request 1250 will be described later with reference to FIG. 15.

In S1209, the control server 201 searches the registration-key management DB 240 for the registration key contained in the received registration request 1250 and checks the source address of the registration request 1250. The source address of the registration request 1250 is, for example, the IP address allocated to the corresponding gateway apparatus 202 that is the transmission source of the registration request 1250.

More specifically, for example, the control server 201 determines whether or not the source address of the registration request 1250 and the source address stored in association with the registration key contained in the registration request 1250 match each other. A case in which the source addresses match each other will be described in this example.

In S1210, the control server 201 registers the control-target-device ID and the gateway ID, contained in the registration request 1250, into the control-target-device management DB 250 (illustrated in FIG. 8) in association with each other.

In S1211, the control server 201 transmits, to the gateway apparatus 202, a registration response 1260 indicating that the gateway apparatus 202 is registered as the relay apparatus for relaying communication between the control server 201 and the control-target device 203. The registration response 1260 is transmitted, for example, as an OMA-DM message (e.g., DM-device registration alert reception OK).

In S1212, upon receiving the registration response 1260, the gateway apparatus 202 registers, in the control-target-device management local DB 280 illustrated in FIG. 11, the control-target-device ID contained in the registration request 1250.

In S1213, the gateway apparatus 202 transmits, to the control-target device 203, a registration response 1270 indicating that the gateway apparatus 202 is registered as the relay apparatus for relaying communication between the control server 201 and the control-target device 203. The registration response 1270 is transmitted, for example, as an HTTP response message.

This arrangement allows authentication of the gateway apparatus 202 that is the transmission source of the registration request 1250 and registration of the gateway apparatus 202 as the relay apparatus for relaying communication between the control server 201 and the control-target device 203.

In S1203, the control server 201 may also set a first expiration date and time of the generated registration key (details of such an arrangement will be described later). In such a case, the issuance response 1230 may contain information indicating the first expiration date and time. In S1210, the control server 201 may set a second expiration date and time until which the gateway apparatus 202 is registered as the relay apparatus (details of such an arrangement will be described later). In such a case, the registration response 1260 may contain information indicating the second expiration date and time.

Specific Example of Issuance Request 1220

Figure 13:
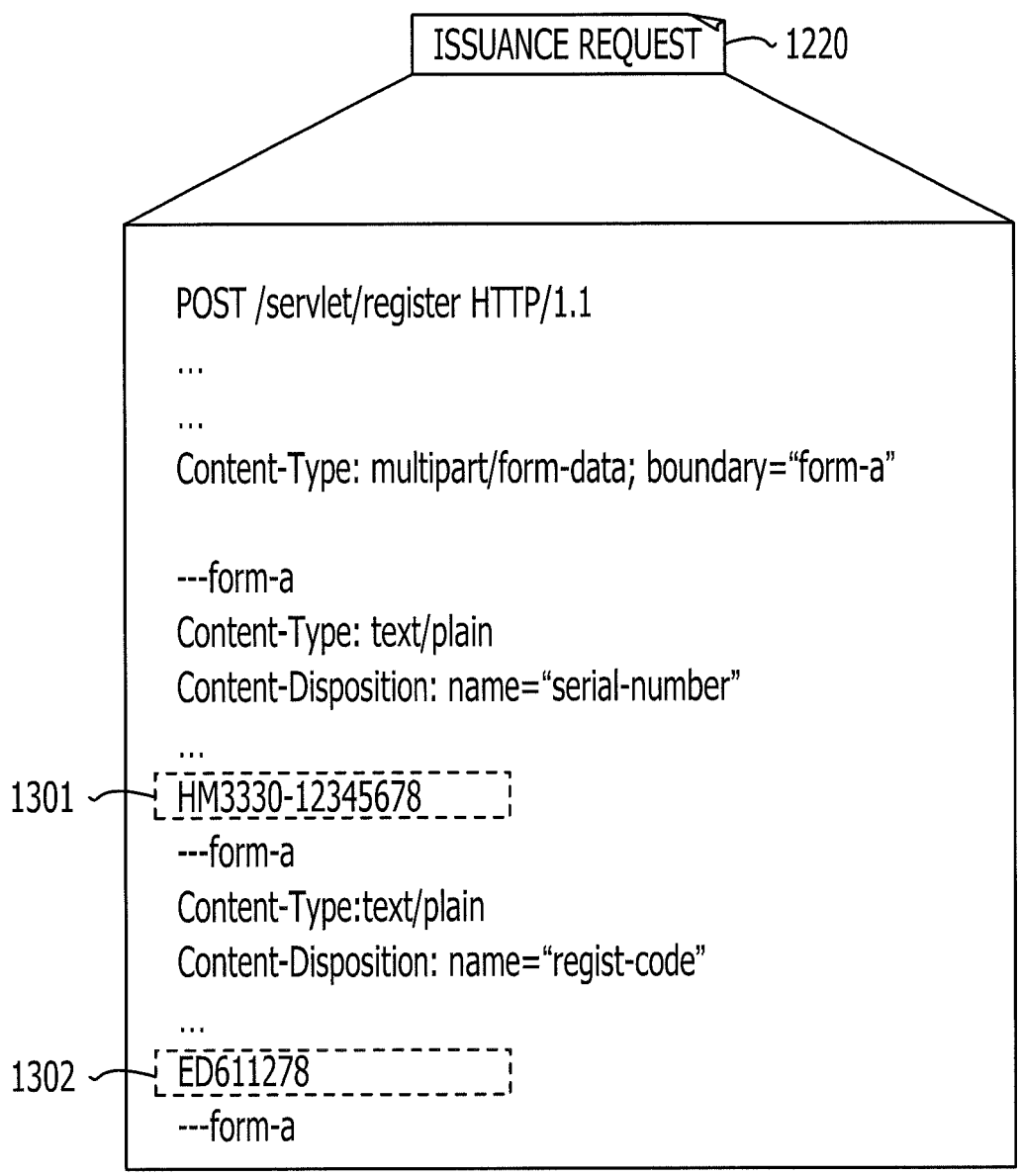
FIG. 13 illustrates a specific example of an issuance request.

Next, a description will be given of a specific example of the issuance request 1220 transmitted in S1201 illustrated in FIG. 12. FIG. 13 illustrates a specific example of the issuance request 1220. The issuance request 1220 illustrated in FIG. 13 is to request the control server 201 so as to issue the registration key unique to the control-target device 203.

Specifically, the issuance request 1220 contains the control-target-device ID "HM3330-12345678" (denoted by reference numeral "1301" in FIG. 13) of the control-target device 203 and registration PW "ED611278" (denoted by reference numeral "1302" in FIG. 13) set for the control-target device 203. With the issuance request 1220, it is possible to request the control server 201 so as to issue the registration key unique to the control-target device 203 with the control-target-device ID "HM3330-12345678".

Specific Example of Issuance Response 1230

Figure 14:
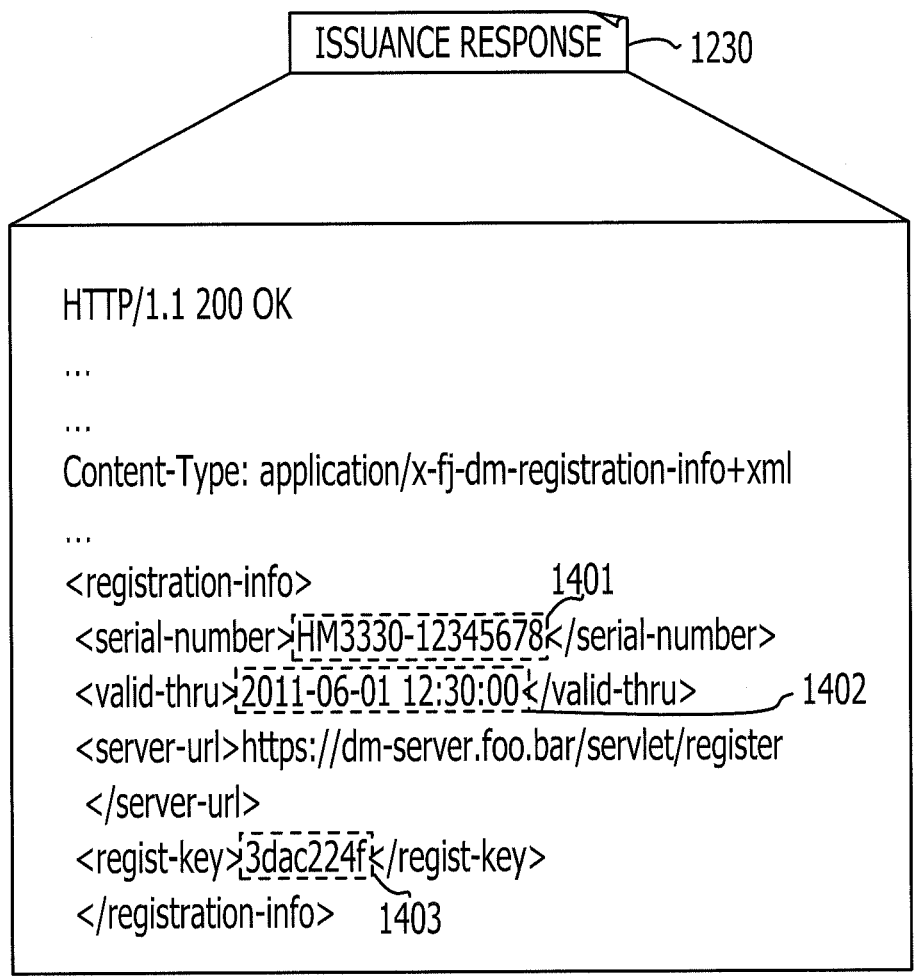
FIG. 14 illustrates a specific example of an issuance response.

Next, a description will be given of a specific example of the issuance response 1230 transmitted in S1204 illustrated in FIG. 12. FIG. 14 illustrates a specific example of the issuance response 1230. The issuance response 1230 illustrated in FIG. 14 is a response to the issuance request 1220 for issuing the registration key unique to the control-target device 203.

Specifically, the issuance response 1230 contains the control-target-device ID "HM3330-12345678" (denoted by reference numeral "1401" in FIG. 14) of the control-target device 203, first expiration date and time "2011-06-01 12:30:00" (denoted by reference numeral "1402" in FIG. 14) of the registration key unique to the control-target device 203, and registration key "3dac224f" (denoted by reference numeral "1403" in FIG. 14).

With this issuance response 1230, it is possible to notify the control-target device 203 about the registration key "3dac224f" unique to the control-target device 203 with the control-target-device ID "HM3330-12345678" and the first expiration date and time "2011-06-01 12:30:00".

Specific Example of Registration Request 1250

Figure 15:
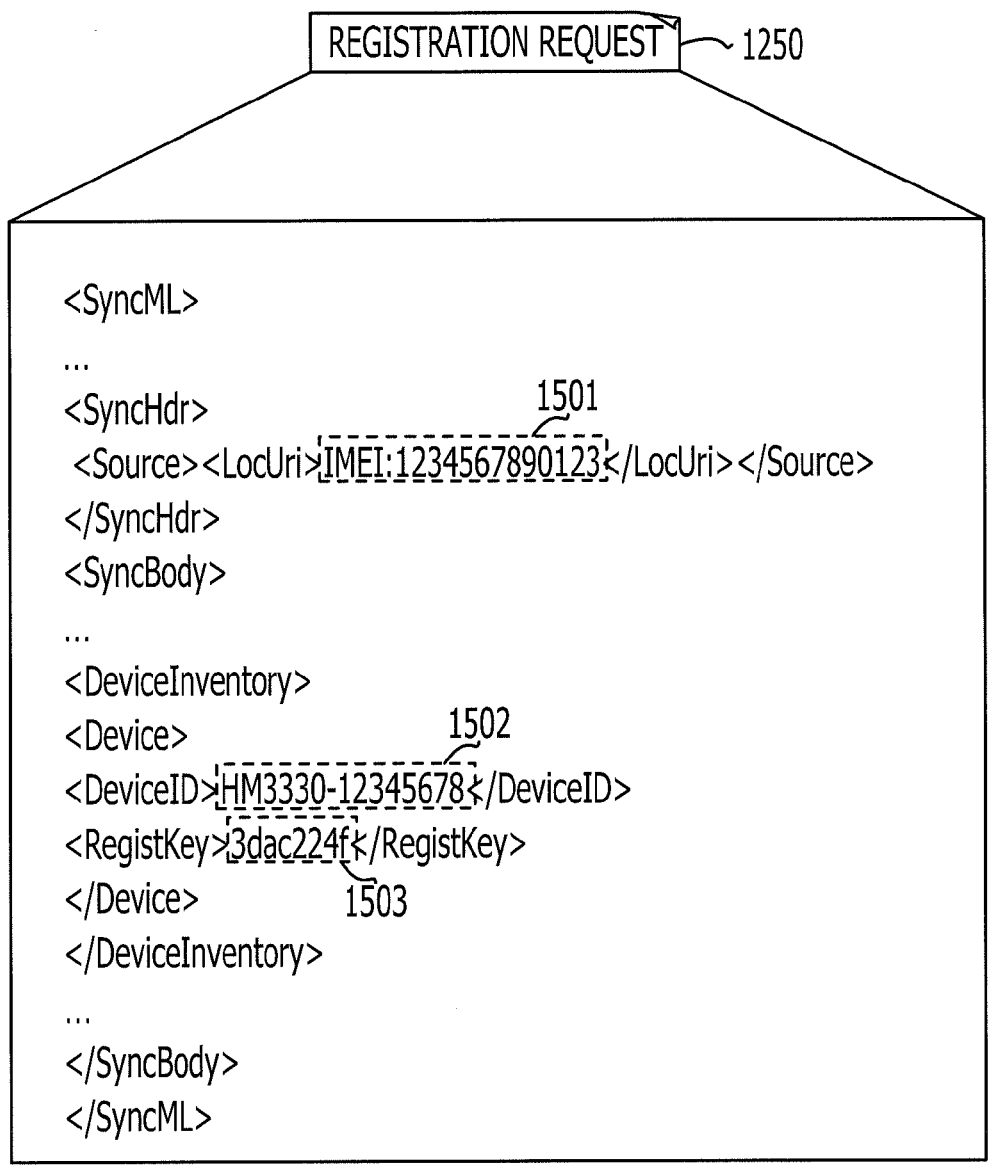
FIG. 15 illustrates a specific example of a registration request.

Next, a description will be given of a specific example of the registration request 1250 transmitted in S1208 illustrated in FIG. 12. FIG. 15 illustrates a specific example of the registration request 1250. The registration request 1250 illustrated in FIG. 15 is to request the control server 201 so as to register a relay apparatus for relaying communication between the control server 201 and the control-target device 203.

Specifically, the registration request 1250 contains the gateway ID "IMEI:1234567890123" (denoted by reference numeral "1501" in FIG. 15) of the gateway apparatus 202, the control-target-device ID "HM3330-12345678" (denoted by reference numeral "1502" in FIG. 15) of the control-target device 203, and the registration key "3dac224f" (denoted by reference numeral "1503" in FIG. 15) unique to the control-target device 203.

With this registration request 1250, it is possible to request the control server 201 so as to register a relay apparatus for relaying communication between the control server 201 and the control-target device 203 with the control-target-device ID "HM3330-12345678". More specifically, for example, it is possible to request the control server 201 so as to register the gateway apparatus 202 with the gateway ID "IMEI:1234567890123" as the relay apparatus.

Next, a description will be given of an exemplary operation sequence of collection processing for collecting data from the control-target device 203. The "data" in this case refers to, for example, various types of data resulted from measurement performed by each control-target device 203.

Figure 16:
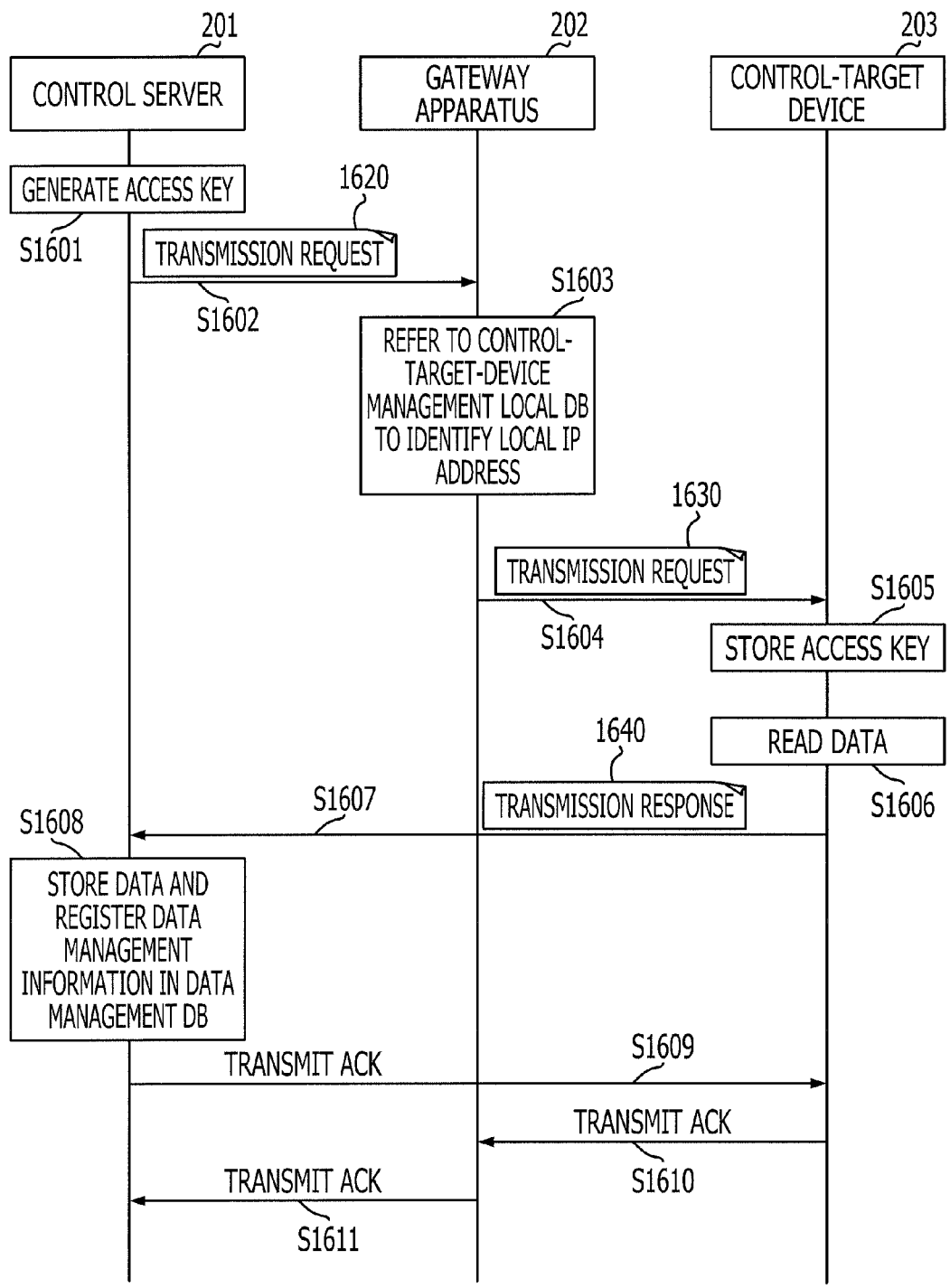
FIG. 16 is a sequence diagram illustrating an example of a collection processing procedure of the communication system.

FIG. 16 is a sequence diagram illustrating an example of a collection processing procedure of the communication system 200. In this case, it is assumed that the control server 201 transmits, to the gateway apparatus 202 with the gateway ID "IMEI:1234567890123", a collection request for collecting data resulted from measurement performed by the control-target device 203.

In S1601, the control server 201 generates an access key unique to the gateway apparatus 202 with the gateway ID "IMEI:1234567890123". The generated access key is registered in the access-key table 260 illustrated in FIG. 9.

In S1602, the control server 201 transmits, to the gateway apparatus 202, a transmission request 1620 for transmitting data resulted from measurement performed by the control-target device 203. The transmission request 1620 contains the control-target-device ID of the control-target device 203 and the access key for the gateway apparatus 202. A specific example of the transmission request 1620 will be described later with reference to FIG. 17.

In S1603, by referring to the control-target-device management local DB 280 illustrated in FIG. 11, the gateway apparatus 202 identifies the local IP address associated with the control-target-device ID contained in the transmission request 1620.

In S1604, the gateway apparatus 202 transmits, to the control-target device 203, a transmission request 1630 for transmitting the data resulted from measurement performed by the control-target device 203. The transmission request 1630 contains the access key for the gateway apparatus 202, which is contained in the transmission request 1620. The destination address of the transmission request 1630 is the local IP address identified in S1603.

In S1605, the control-target device 203 stores, in the memory 502, the access key contained in the received transmission request 1630.

In S1606, the control-target device 203 reads measurement data from the memory 502.

In S1607, the control-target device 203 transmits a transmission response 1640 containing the read data to the control server 201. The transmission response 1640 contains the access key contained in the transmission request 1630 and the control-target-device ID of the control-target device 203. The transmission response 1640 is transmitted, for example, as an HTTP message.

In S1608, the control server 201 stores, in a storage device, the data contained in the received transmission response 1640 and registers data management information in the data management DB 270 illustrated in FIG. 10. More specifically, for example, the control server 201 registers the storage location of the data, the access key and the control-target-device ID contained in the transmission response 1640, and the gateway ID into the data management DB 270 in association with each other. The storage device is, for example, the RAM 303, the magnetic disk 305, or the optical disk 307 illustrated in FIG. 3.

In S1609, the control server 201 transmits, to the control-target device 203, a message ACK indicating that the data is received.

In S1610, the control-target device 203 transmits, to the gateway apparatus 202, a message ACK indicating that the data transmission is properly completed.

In S1611, the gateway apparatus 202 transmits, to the control server 201, a message ACK indicating that the data transmission is properly completed.

As a result, the control server 201 may identify the gateway apparatus 202 that received the data transmission request, by using the data management DB 270 and the access key that is transmitted during the data transmission and that is unique to the gateway apparatus 202, and may attach information associated with the gateway apparatus 202 to the collected data. The information associated with the gateway apparatus 202 may be, for example, information (the name and address) of the owner of the gateway apparatus 202. The information associated with the gateway apparatus 202 may be stored in, for example, a storage device, such as the RAM 303, the magnetic disk 305, or the optical disk 307.

In S1608, upon receiving the transmission response 1640 transmitted from the control-target device 203 via the gateway apparatus 202, the control server 201 may also attach, to the collected data, gateway-apparatus position information separately collected from the gateway apparatus 202. The position information indicates the current location of the gateway apparatus 202 and may be acquired by a GPS unit (not illustrated). With this arrangement, it is possible to attach the position information to the data collected from the control-target device 203.

Specific Example of Transmission Request 1620

Figure 17:
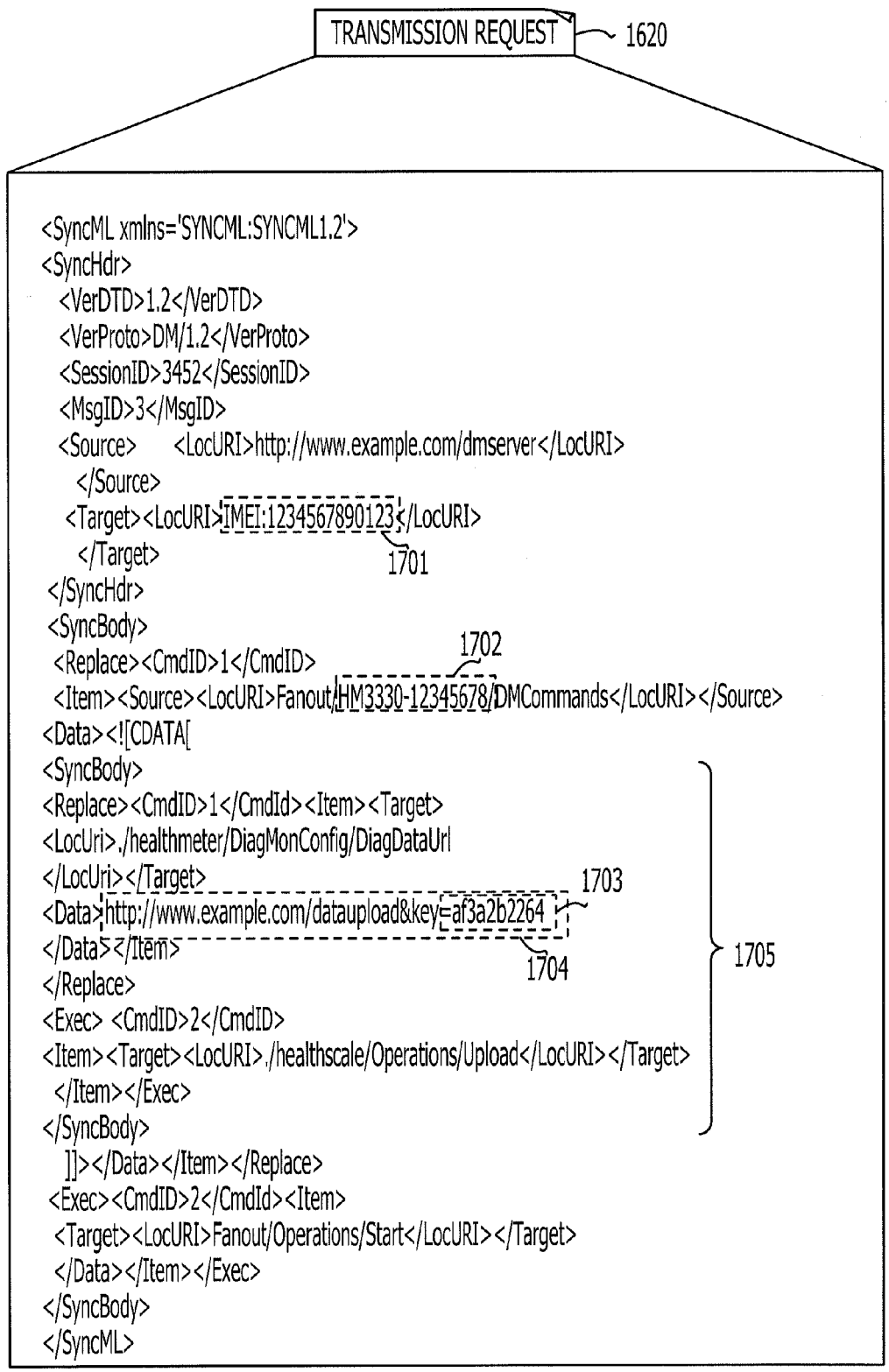
FIG. 17 illustrates a specific example of a transmission request.

Next, a description will be given of a specific example of the transmission request 1620 transmitted in S1602 illustrated in FIG. 16. FIG. 17 illustrates a specific example of the transmission request 1620. The transmission request 1620 illustrated in FIG. 17 is to request the gateway apparatus 202 so as to transmit the data resulted from measurement performed by the control-target device 203. FIG. 17 illustrates extracted part of the transmission request 1620.

Specifically, the transmission request 1620 contains the gateway ID "IMEI:1234567890123" (denoted by reference numeral "1701" in FIG. 17) of the gateway apparatus 202, the control-target-device ID "HM3330-12345678" (denoted by reference numeral "1702" in FIG. 17) of the control-target device 203, and the access key "af3a2b2264" (denoted by reference numeral "1703" in FIG. 17) unique to the gateway apparatus 202. The transmission request 1620 also contains information "http://www.example.com/dataupload&key=af3a2b2264" (denoted by reference numeral "1704" in FIG. 17) representing a site to which the data resulted from measurement performed by the control-target device 203 is to be uploaded.

With the transmission request 1620, it is possible to request the gateway apparatus 202 with the gateway ID "IMEI: 1234567890123" so as to transmit the data resulted from measurement performed by the control-target device 203 with the control-target-device ID "HM3330-12345678".

The transmission request 1630 transmitted in S1604 illustrated in FIG. 16 is created based on the transmission request 1620. More specifically, for example, the transmission request 1630 is a SyncML (Synchronization Markup Language) message obtained by copying an element (denoted by reference numeral "1705") in the transmission request 1620 and replacing a SyncHdr element for each control-target device 203.

Exemplary Functional Configuration of Control Server 201

Figure 18:
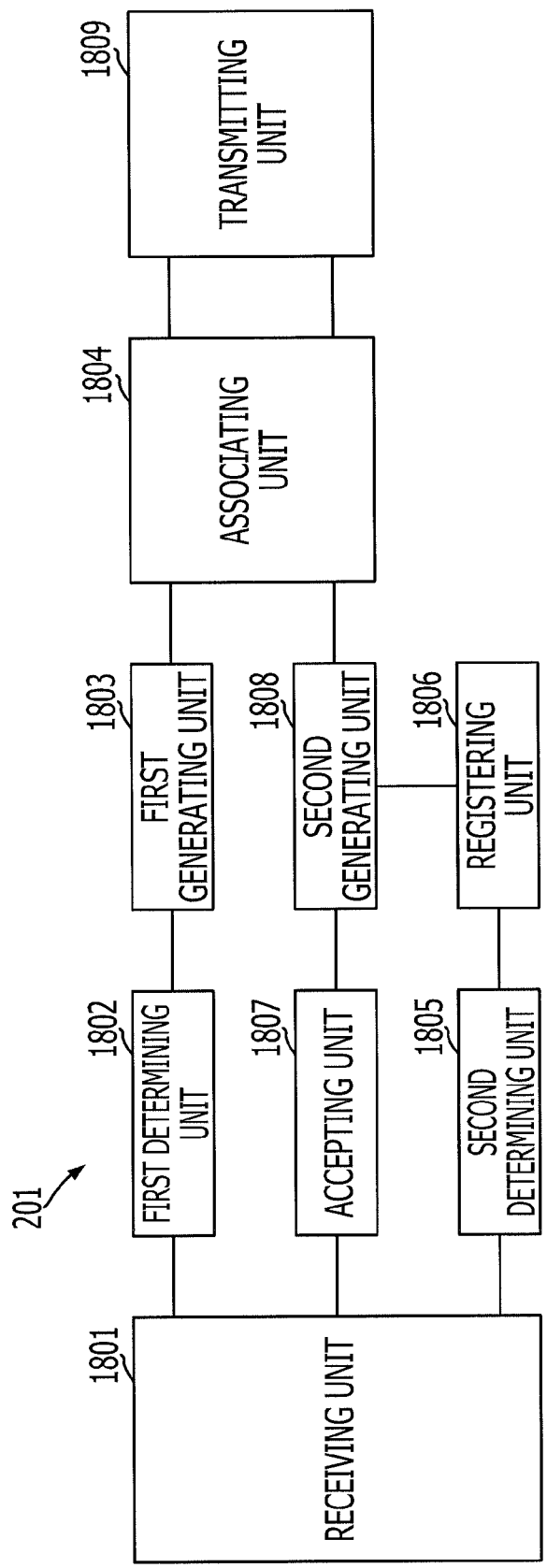
FIG. 18 is a block diagram illustrating an exemplary functional configuration of the control server.

Next, a description will be given of an exemplary functional configuration of the control server 201. FIG. 18 is a block diagram illustrating an exemplary functional configuration of the control server 201. As illustrated in FIG. 18, the control server 201 includes a receiving unit 1801, a first determining unit 1802, a first generating unit 1803, an associating unit 1804, a second determining unit 1805, a registering unit 1806, an accepting unit 1807, a second generating unit 1808, and a transmitting unit 1809. These functional units 1801 to 1809 provide functions of a control unit, and specifically, for example, the functions are realized by causing the CPU 301 to execute a program stored in a storage device, such as the ROM 302, the RAM 303, the magnetic disk 305, or the optical disk 307 or by using the interface 309 illustrated in FIG. 3. Processing results of the functional units 1801 to 1809 are stored in a storage device, such as the RAM 303, the magnetic disk 305, or the optical disk 307.

The receiving unit 1801 has a function for receiving, from the control-target device 203 via the gateway apparatus 202 that is accessible to the control-target device 203, the issuance request for issuing a registration key unique to the control-target device 203. More specifically, for example, the receiving unit 1801 receives an issuance request 1220 (as illustrated in FIG. 13) via the gateway apparatus 202.

The first determining unit 1802 has a function for determining, upon reception of the registration-key issuance request, whether or not the registration PW stored in the registration-PW management DB 230 and associated with the control-target-device ID of the control-target device 203, which is contained in the registration-key issuance request, matches the registration PW contained in the registration-key issuance request. In this case, it is assumed that the issuance request 1220 illustrated in FIG. 13 is received.

In this case, for example, the first determining unit 1802 searches the registration-PW management DB 230 for registration PW information indicating the control-target-device ID "HM3330-12345678" contained in the issuance request 1220. In this case, the registration PW information 600-1 is found. The first determining unit 1802 determines whether or not the registration PW "ED611278" indicated by the registration PW information 600-1 and the registration PW "ED611278" contained in the issuance request 1220 match each other. In this case, it is determined that the registration PWs match each other.

The first generating unit 1803 has a function for generating a registration key unique to the control-target device 203. Specifically, for example, when it is determined that the registration PWs match each other, the first generating unit 1803 may generate a registration key unique to the control-target device 203. More specifically, for example, the first generating unit 1803 generates a new registration key that is not the same as any of the registration keys registered in the registration-key management DB 240.

A random number may be used as the registration key. In such a case, for example, by using a random-number generator to generate a random number, the first generating unit 1803 may generate the registration key unique to the control-target device 203.

The associating unit 1804 has a function for associating the address, allocated to the gateway apparatus 202 that is the transmission source of the issuance request, and the generated registration key with each other. The address allocated to the gateway apparatus 202 is, for example, an IP address for identifying the gateway apparatus 202 in the network 210.

Since address resources are generally limited, servers at communication service providers release IP addresses allocated to terminals that have not made access for a certain continuous period of time (e.g., 30 minutes), in order to ensure that the address resources are not exhausted. That is, there are cases in which the IP address allocated to the gateway apparatus 202 is changed. Thus, there is a possibility that multiple registration keys are associated with a single IP address.

Accordingly, the first generating unit 1803 may set a valid period of the generated registration key. Specifically, for example, the first generating unit 1803 may set, as a first expiration date and time of the registration key, a time point after a predetermined period (e.g., 30 minutes or one hour) from a time point at which the registration key is generated. Such an arrangement may limit the validity of a pair of the registration key and the IP address, thus making it possible to significantly reduce the possibility that multiple registration keys are associated with a single IP address.

In this case, the associating unit 1804 registers, for example, the registration key, the control-target-device ID contained in the issuance request, the first expiration date and time of the registration key, and the IP address allocated to the gateway apparatus 202 into the registration-key management DB 240 in association with each other. As a result, new registration-key information is stored in the registration-key management DB 240 as a record.

The transmitting unit 1809 has a function for transmitting, to the control-target device 203 via the gateway apparatus 202 that is the transmission source of the issuance request, an issuance response containing the generated registration key. More specifically, for example, the transmitting unit 1809 transmits, to the control-target device 203, an issuance response 1230 (as illustrated in FIG. 14) via the gateway apparatus 202.

The receiving unit 1801 also has a function for receiving, from the gateway apparatus 202, a registration request for registering a relay apparatus for relaying communication between the control server 201 and the control-target device 203 as a result of the transmission of the issuance response. More specifically, for example, as a result of the transmission of the registration key received by the control-target device 203, from the control-target device 203 to the gateway apparatus 202, the receiving unit 1801 receives, from the gateway apparatus 202, a registration request 1250 (as illustrated in FIG. 15) containing the registration key.

The second determining unit 1805 has a function for determining whether or not the address allocated to the gateway apparatus 202 that is the transmission source of the received registration request and the address stored in association with the registration key contained in the received registration request match each other. The second determining unit 1805 may also determine whether or not the registration request has been received within the valid period set for the registration key contained in the received registration request.

It is now assumed that the registration request 1250 illustrated in FIG. 15 is received. In this case, the second determining unit 1805 searches the registration-key management DB 240 for registration-key information indicating registration key "3dac224f" contained in the registration request 1250. In this case, the registration-key information 700-1 is found.

The second determining unit 1805 then determines whether or not the source address "192.xx.44.14" indicated by the registration-key information 700-1 and the IP address allocated to the gateway apparatus 202 that is the transmission source of the registration request 1250 match each other. The second determining unit 1805 also determines whether or not the date and time of the reception of the registration request 1250 is before the first expiration date and time "2011/6/1 12:30:00" indicated by the registration-key information 700-1.

The registering unit 1806 also has a function for registering, when it is determined that the addresses match each other, the gateway apparatus 202 that is the transmission source of the registration request as the relay apparatus for relaying communication between the control server 201 and the control-target device 203. The registering unit 1806 may register the gateway apparatus 202 that is the transmission source of the registration request as the relay apparatus when it is determined that the addresses match each other and the registration request has been received within the valid period.

The registering unit 1806 may also set a registration period during which the gateway apparatus 202 that is the transmission source of the registration request is registered as the relay apparatus. More specifically, for example, the registering unit 1806 may set, as a second expiration date and time of the relay apparatus, a time point after a predetermined period (e.g., one week or one month) from a time point at which the gateway apparatus 202 that is the transmission source of the registration request was registered as the relay apparatus.

Specifically, for example, the registering unit 1806 registers the gateway ID of the gateway apparatus 202 that is the transmission source of the registration request, the control-target-device ID of the control-target device 203, and the second expiration date and time into the control-target-device management DB 250 (illustrated in FIG. 8) in association with each other. In the registration, the device name of the control-target device 203 may also be registered in association with the gateway ID, the control-target-device ID, and the second expiration date and time. The device name of the control-target device 203 may be stored in, for example, the registration-PW management DB 230 in association with the control-target-device ID. As a result, new control-target-device information is stored in the control-target-device management DB 250 as a record.

The transmitting unit 1809 also has a function for transmitting a relay-apparatus registration response to the gateway apparatus 202. The registration response contains, for example, the control-target-device ID of the control-target device 203, the registration key unique to the control-target device 203, and information indicating the second expiration date and time indicating the registration period.

When the gateway apparatus 202 is not registered as the relay apparatus, the transmitting unit 1809 may transmit, to the gateway apparatus 202, an error notification indicating that the gateway apparatus 202 is not registered as the relay apparatus.

The accepting unit 1807 has a function for accepting a collection request for collecting data output from the control-target device 203. Specific examples of the data include body-weight data from a health scale, blood-pressure data from a sphygmomanometer, temperature data from a temperature sensor, and date-and-time data of startup of each control-target device 203.

For example, the accepting unit 1807 may accept the data collection request from a user who operates a web application. The accepting unit 1807 may also accept the data collection request input by a user performing an input operation on the control server 201 with the keyboard 310 and the mouse 311 illustrated in FIG. 3.

The data collection request contains, for example, the gateway ID of the gateway apparatus 202. The gateway ID is the identification information of the gateway apparatus 202 that is the transmission source of the collected data. The data collection request contains, for example, the control-target-device ID of the control-target device 203. The control-target-device ID is information that the gateway apparatus 202 uses to identify the control-target device 203 from which the data is to be collected.

The second generating unit 1808 has a function for generating, when the data collection request is accepted, an access key unique to the gateway apparatus 202 registered as the relay apparatus. The access key is to identify the gateway apparatus 202 registered as the relay apparatus and is represented by, for example, characters, numerals, symbols, or a combination of any of characters, numerals, and symbols.

More specifically, for example, the second generating unit 1808 determines whether or not the gateway ID contained in the data collection request is registered in the control-target-device management DB 250. As a result of the determination, it is possible to determine whether or not the gateway apparatus 202 that is the transmission source of the data collection request is registered as the relay apparatus for relaying a communication with the control-target device 203.

The second generating unit 1808 may determine whether or not the pair of the gateway ID and the control-target-device ID contained in the data collection request is registered in the control-target-device management DB 250. As a result of the determination, it is possible to determine whether or not the gateway apparatus 202 that is the transmission source of the data collection request is registered as the relay apparatus for relaying a communication with the control-target device 203 from which the data is to be collected.

When the gateway apparatus 202 is registered as the relay apparatus, the second generating unit 1808 generates an access key unique to the gateway apparatus 202 that is the transmission source of the data collection request. More specifically, for example, the second generating unit 1808 generates a new access key that is not the same as any of the access keys registered in the access-key table 260.

When the access key associated with the gateway ID contained in the data collection request is already registered in the access-key table 260, it is preferable that the second generating unit 1808 does not generate a new access key. With such an arrangement, multiple access keys may not be generated for one gateway apparatus 202.

The second generating unit 1808 may also determine whether or not the data collection request has been accepted within the registration period set for the gateway apparatus 202 that is the transmission source of the data collection request. More specifically, for example, the second generating unit 1808 determines whether or not the date and time of the reception of the data collection request is before the second expiration date and time stored in the control-target-device management DB 250 in association with the gateway ID contained in the data collection request.

Then, when the gateway apparatus 202 that is the transmission source of the data collection request is registered as the relay apparatus and the data collection request has been accepted within the registration period, the second generating unit 1808 may generate an access key for the gateway apparatus 202. With such an arrangement, the access key may be issued with respect to only the gateway apparatus 202 from which the data collection request is received within the registration period.

The associating unit 1804 also has a function for associating the gateway ID of the gateway apparatus 202 and the access key unique to the gateway apparatus 202 with each other. More specifically, for example, the associating unit 1804 registers the gateway ID contained in the data collection request and the generated access key into the access-key table 260 in association with each other. In the registration, the associating unit 1804 may further register the user name of the user who uses the gateway apparatus 202 into the access-key table 260 in association with the gateway ID and the access key.

As a result, new access-key information is stored in the access-key table 260 as a record. The user name is contained in, for example, the data collection request. The associating unit 1804 may also identify the user name associated with the gateway ID contained in the data collection request, by referring to a table (not illustrated) in which the user name of the user who uses the gateway apparatus 202 and the gateway ID are stored in association with each other.

The transmitting unit 1809 also has a function for transmitting a data transmission request to the gateway apparatus 202 that is the transmission source of the data collection request. The data transmission request contains the generated access key unique to the gateway apparatus 202. Specifically, for example, the transmitting unit 1809 transmits a transmission request 1620 (as illustrated in FIG. 17) to the gateway apparatus 202.

The destination address of the data transmission request is, for example, the source address of the data collection request. For example, by using the OMA-DM technology, the control server 201 may also obtain a contact address (e.g., a telephone number) on the basis of the gateway ID contained in the data collection request to establish a communication with the gateway apparatus 202 that is the transmission source of the data collection request.

The receiving unit 1801 also has a function for receiving a data transmission response from the gateway apparatus 202 as a result of the transmission of the data transmission request. The data transmission response contains, for example, the gateway ID of the gateway apparatus 202, the control-target-device ID of the control-target device 203, the data resulted from measurement performed by the control-target device 203, and the access key contained in the transmission request.

The received data is stored in, for example, a storage device, such as the RAM 303, the magnetic disk 305, or the optical disk 307. The gateway ID, the control-target-device ID, and the access key contained in the data transmission response, the date and time of the reception of the transmission response, and the storage location of the data are registered in the data management DB 270 in association with each other. As a result, new data management information is stored in the data management DB 270 as a record. The received data may also be output in another way. For example, the received data may be displayed on the display 308, output to the printer 313 for printing, or transmitted to an external apparatus via the interface 309.

Although a case in which the control server 201 collects data from the control-target device 203 via the gateway apparatus 202 has been described above, the present embodiment is not limited thereto. For example, by referring to the control-target-device management DB 250, the control server 201 may transmit information to be distributed to the control-target device 203 via the gateway apparatus 202. Examples of the information to be distributed include information regarding an update of software installed on the control-target device 203 and service information supplied to the user who uses the control-target device 203.

The control server 201 may also delete, of the records in the registration-key management DB 240, any record that has passed a certain period of time (e.g., one hour or one day) from the first expiration date and time. The control server 201 may also delete, of the records in the control-target-device management DB 250, any record that has passed a certain period of time (e.g., one day or one week) from the second expiration date and time.

Exemplary Functional Configuration of Gateway Apparatus 202

Figure 19:
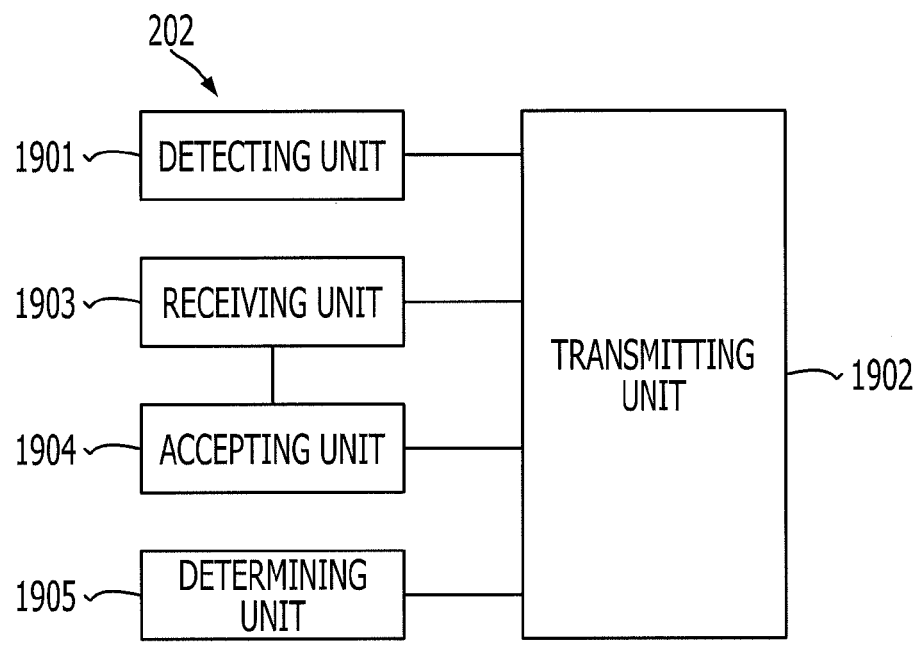
FIG. 19 is a block diagram illustrating an exemplary functional configuration of the gateway apparatus.

Next, a description will be given of an exemplary functional configuration of the gateway apparatus 202. FIG. 19 is a block diagram illustrating an exemplary functional configuration of the gateway apparatus 202. In FIG. 19, the gateway apparatus 202 includes a detecting unit 1901, a transmitting unit 1902, a receiving unit 1903, an accepting unit 1904, and a determining unit 1905. These functional units 1901 to 1905 provide functions of a control unit, and specifically, for example, the functions are realized by causing the CPU 401 to execute a program stored in the memory 402 or by using the interface 403 illustrated in FIG. 4. Processing results of the functional units 1901 to 1905 are stored in, for example, the memory 402.

The detecting unit 1901 has a function for detecting the control-target device 203. More specifically, for example, the detecting unit 1901 detects the control-target device 203 that may connect via the network 220.

The transmitting unit 1902 has a function for transmitting to the control-target device 203, upon detection of the control-target device 203, an initiation request for initiating the processing for requesting issuance of the registration key unique to the control-target device 203. The initiation request is to request transmission of a registration-key issuance request from the control-target device 203 to the control server 201.

The receiving unit 1903 has a function for receiving the registration key unique to the control-target device 203. More specifically, for example, the receiving unit 1903 receives a relay-apparatus registration request from the detected control-target device 203. This registration request contains, for example, the control-target-device ID of the control-target device 203 and the registration key for the control-target device 203.

The transmitting unit 1902 also has a function for transmitting to the control server 201, upon reception of the registration key, a registration request for registering a relay apparatus for relaying communication between the control server 201 and the control-target device 203. The registration request contains, for example, the gateway ID of the gateway apparatus 202, the control-target-device ID of the control-target device 203, and the registration key for the control-target device 203.

The accepting unit 1904 has a function for accepting the data collection request. Data to be collected is, for example, various types of data resulted from measurement performed by the detected control-target device 203. The data collection request contains, for example, the control-target-device ID of the control-target device 203.

More specifically, for example, the accepting unit 1904 may receive the data collection request from the detected control-target device 203. The accepting unit 1904 may also accept the data collection request input by a user performing an input operation using the keypad 405 illustrated in FIG. 4.

The transmitting unit 1902 also has a function for transmitting the data collection request to the control server 201 when the data collection request is accepted. The data collection request contains, for example, the control-target-device ID of the control-target device 203 and the gateway ID of the gateway apparatus 202.

The determining unit 1905 has a function for determining whether or not the registration period for the relay apparatus has expired. More specifically, for example, by referring to the control-target-device management local DB 280, the determining unit 1905 determines whether or not the current time is after the second expiration date and time with respect to each control-target device 203.

The transmitting unit 1902 also has a function for transmitting, to the control-target device 203, an initiation request for initiating the processing for requesting issuance of the registration key unique to the control-target device 203, when the current time is after the registration period. With this arrangement, it is possible to perform control so that, when the registration period for the relay apparatus has expired, the issuance request for issuing the registration key may be retransmitted from the control-target device 203 to the control server 201.

Exemplary Functional Configuration of Control-Target Device 203

Figure 20:
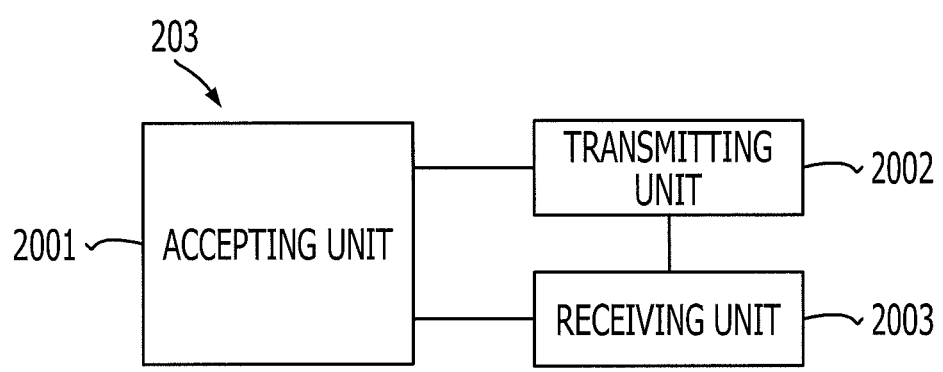
FIG. 20 is a block diagram illustrating an exemplary functional configuration of the control-target device.

Next, a description will be given of an exemplary functional configuration of the control-target device 203. FIG. 20 is a block diagram illustrating an exemplary functional configuration of the control-target device 203. As illustrated in FIG. 20, the control-target device 203 includes an accepting unit 2001, a transmitting unit 2002, and a receiving unit 2003. These functional units 2001 to 2003 provide functions of a control unit, and specifically, for example, the functions are realized by causing the CPU 501 to execute a program stored in the memory 502 or by using the interface 503 illustrated in FIG. 5. Processing results of the functional units 2001 to 2003 are stored in, for example, the memory 502.

The accepting unit 2001 has a function for accepting an initiation request for initiating the processing for requesting issuance of the registration key unique to the control-target device 203. Specifically, for example, the accepting unit 2001 may accept the initiation request for initiating the processing for requesting issuance of the registration key. The initiation request is input by a user performing an input operation using the operation button 505 illustrated in FIG. 5. The accepting unit 2001 may also receive, from the gateway apparatus 202, the initiation request for initiating the processing for requesting issuance of the registration key unique to the control-target device 203.

The transmitting unit 2002 has a function for transmitting, to the control server 201 via the gateway apparatus 202, the issuance request for issuing the registration key unique to the control-target device 203 when the initiation request for initiating the issuance request processing is accepted. The address of the control server 201 is stored in, for example, the memory 502.

The receiving unit 2003 has a function for receiving, as a result of the transmission of the issuance request for issuing the registration key, an issuance response for the registration key unique to the control-target device 203 from the control server 201 via the gateway apparatus 202. The registration key contained in the received issuance response is stored in, for example, the memory 502.

The transmitting unit 2002 also has a function for transmitting the registration key contained in the issuance response to the gateway apparatus 202 when the issuance response for the registration key is received. More specifically, for example, the transmitting unit 2002 transmits, to the gateway apparatus 202, a registration request for registering a relay apparatus for relaying communication between the control server 201 and the control-target device 203. This registration request contains, for example, the control-target-device ID of the control-target device 203 and the registration key for the control-target device 203.

The accepting unit 2001 also has a function for accepting the initiation request for initiating the processing for requesting collection of data. Specifically, for example, the accepting unit 2001 may accept the initiation request for initiating the processing for requesting collection of data. The initiation request is input by the user performing an input operation using the operation button 505. The accepting unit 2001 may also receive, from the gateway apparatus 202, the initiation request for initiating the data collection request processing.

The transmitting unit 2002 may also transmit the data collection request to the gateway apparatus 202 when the initiation request for initiating the data collection request processing is accepted. The data collection request contains, for example, the control-target-device ID of the control-target device 203.

The receiving unit 2003 also has a function for receiving a data transmission request from the gateway apparatus 202. The data transmission request contains the access key unique to the gateway apparatus 202. The access key contained in the received data transmission request is stored in, for example, the memory 502.

Upon reception of the data transmission request, the transmitting unit 2002 transmits a data transmission response to the gateway apparatus 202. The data transmission response contains, for example, the data resulted from measurement performed by the control-target device 203 and the access key unique to the gateway apparatus 202.

Various Processing Procedures of Control Server 201

Next, a description will be given of various processing procedures of the control server 201. First, a description will be given of a registration processing procedure for registering a relay apparatus for relaying communication between the control server 201 and the control-target device 203.

Figure 21:
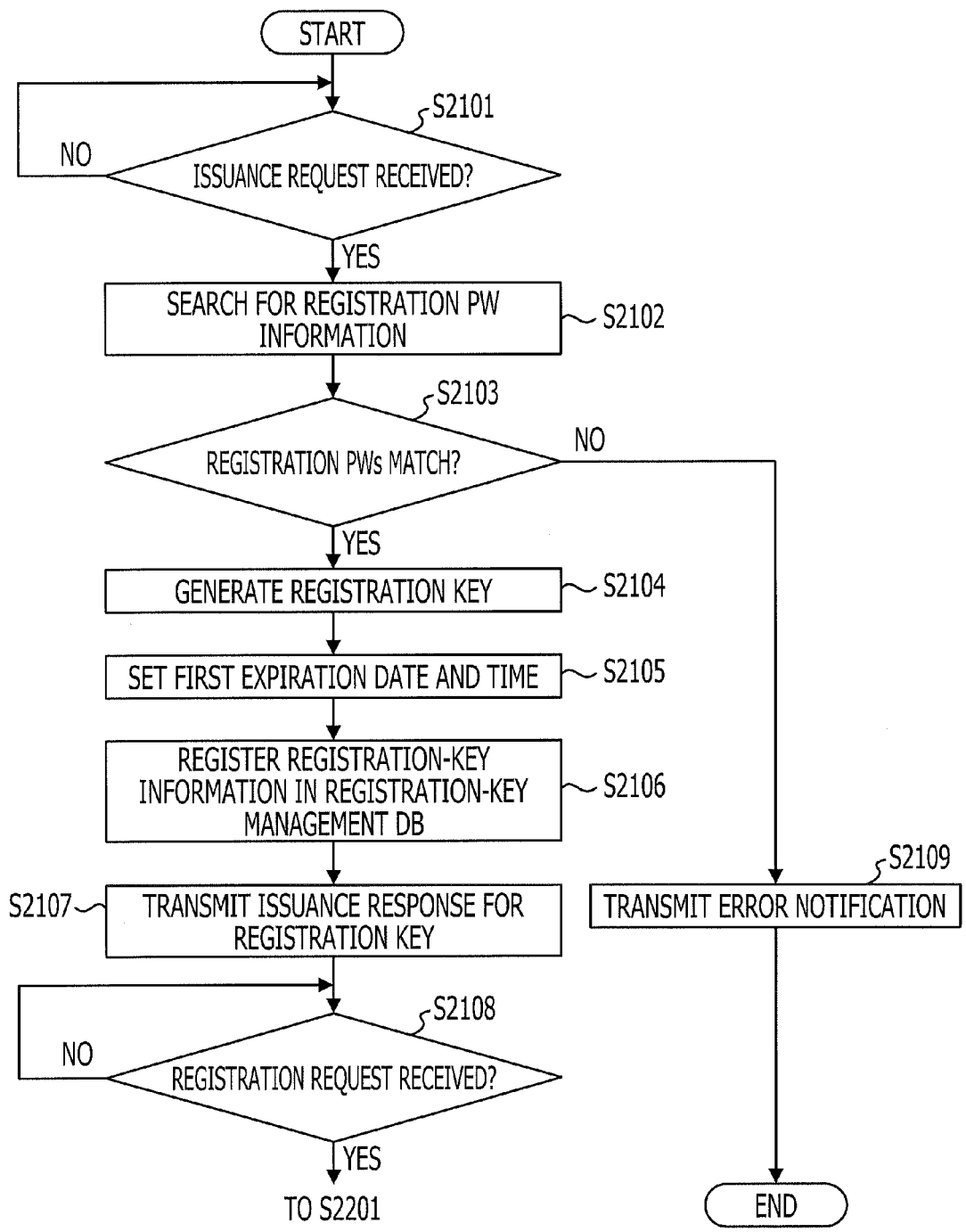
FIG. 21 is a flowchart illustrating an example of a registration processing procedure of the control server.
Figure 22:
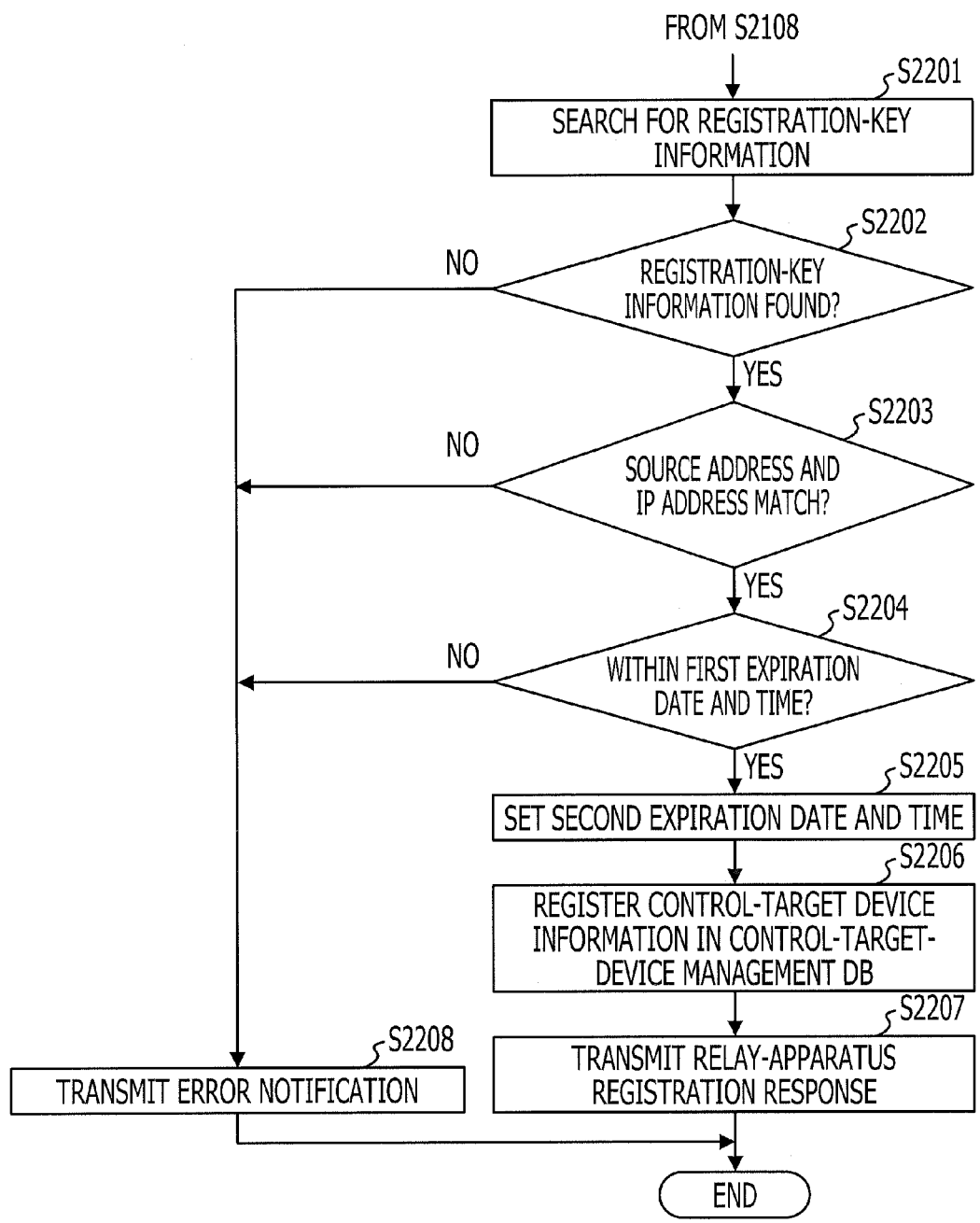
FIG. 22 is a flowchart illustrating an example of the registration processing procedure of the control server.

FIGS. 21 and 22 are flowcharts illustrating an example of a registration processing procedure of the control server 201.

In S2101, the CPU 301 determines whether or not an issuance request (a registration-key issuance request) for issuing a registration key unique to the control-target device 203 is received from the control-target device 203 via the gateway apparatus 202.

In this case, the CPU 301 waits for a registration-key issuance request to be received (No in S2101).

In S2102, when a registration-key issuance request is received (Yes in S2101), the CPU 301 searches the registration-PW management DB 230 for registration PW information indicating the control-target-device ID contained in the registration-key issuance request.

In S2103, the CPU 301 determines whether or not the registration PW indicated by the found registration PW information and the registration PW contained in the registration-key issuance request match each other.

In S2104, when the registration PWs match each other (Yes in S2103), the CPU 301 generates a registration key unique to the control-target device 203.

In S2105, the CPU 301 sets a first expiration date and time for the generated registration key.

In S2106, the CPU 301 registers new registration-key information in the registration-key management DB 240.

In S2107, the CPU 301 transmits an issuance response for the registration key to the control-target device 203 via the gateway apparatus 202 that is the transmission source of the registration-key issuance request.

In S2108, the CPU 301 determines whether or not a registration request (a relay-apparatus registration request) for registering a relay apparatus for relaying communication between the control server 201 and the control-target device 203 is received from the gateway apparatus 202. In this case, the CPU 301 waits for a relay-apparatus registration request to be received (No in S2108).

When a relay-apparatus registration request is received (Yes in S2108), the process proceeds to S2201 illustrated in the flowchart of FIG. 22.

In S2109, when the registration PWs do not match each other (No in S2103), the CPU 301 transmits an error notification to the gateway apparatus 202. Thereafter, the series of processing illustrated in the flowchart ends.

In S2201, the CPU 301 searches the registration-key management DB 240 for the registration-key information indicating the registration key contained in the registration request.

In S2202, the CPU 301 determines whether or not the registration-key information is found.

In S2203, when the registration-key information is found (Yes in S2202), the CPU 301 determines whether or not the source address indicated by the registration-key information and the IP address allocated to the gateway apparatus 202 that is the transmission source of the registration request match each other.

In S2204, when the source address and the IP address match each other (Yes in S2203), the CPU 301 determines whether or not the reception date and time of the registration request is before the first expiration date and time indicated by the registration-key information.

In S2205, when the reception date and time is before the first expiration date and time (Yes in S2204), the CPU 301 sets a second expiration date and time for the relay apparatus.

In S2206, the CPU 301 registers new control-target-device information in the control-target-device management DB 250.

In S2207, the CPU 301 transmits a relay-apparatus registration response to the gateway apparatus 202. Thereafter, the series of processing illustrated in the flowchart ends.

In S2208, when the registration-key information is not found (No in S2202), the CPU 301 transmits an error notification to the gateway apparatus 202. Thereafter, the series of processing illustrated in the flowchart ends.

When the source address and the IP address do not match each other (No in S2203), the process proceeds to S2208. When the reception date and time is not before the first expiration date and time (No in S2204), the process proceeds to S2208.

This arrangement allows authentication of the gateway apparatus 202 and registration of the gateway apparatus 202 as the relay apparatus for relaying communication between the control server 201 and the control-target device 203. When the error notification is transmitted to the gateway apparatus 202, the gateway apparatus 202 may re-transmit, to the control-target device 203, an initiation request for initiating the registration-key issuance request processing. With this arrangement, the processing may be restarted from the registration-key issuance request processing.

Next, a description will be given of a collection processing procedure for collecting data resulted from measurement performed by the control-target device 203.

Figure 23:
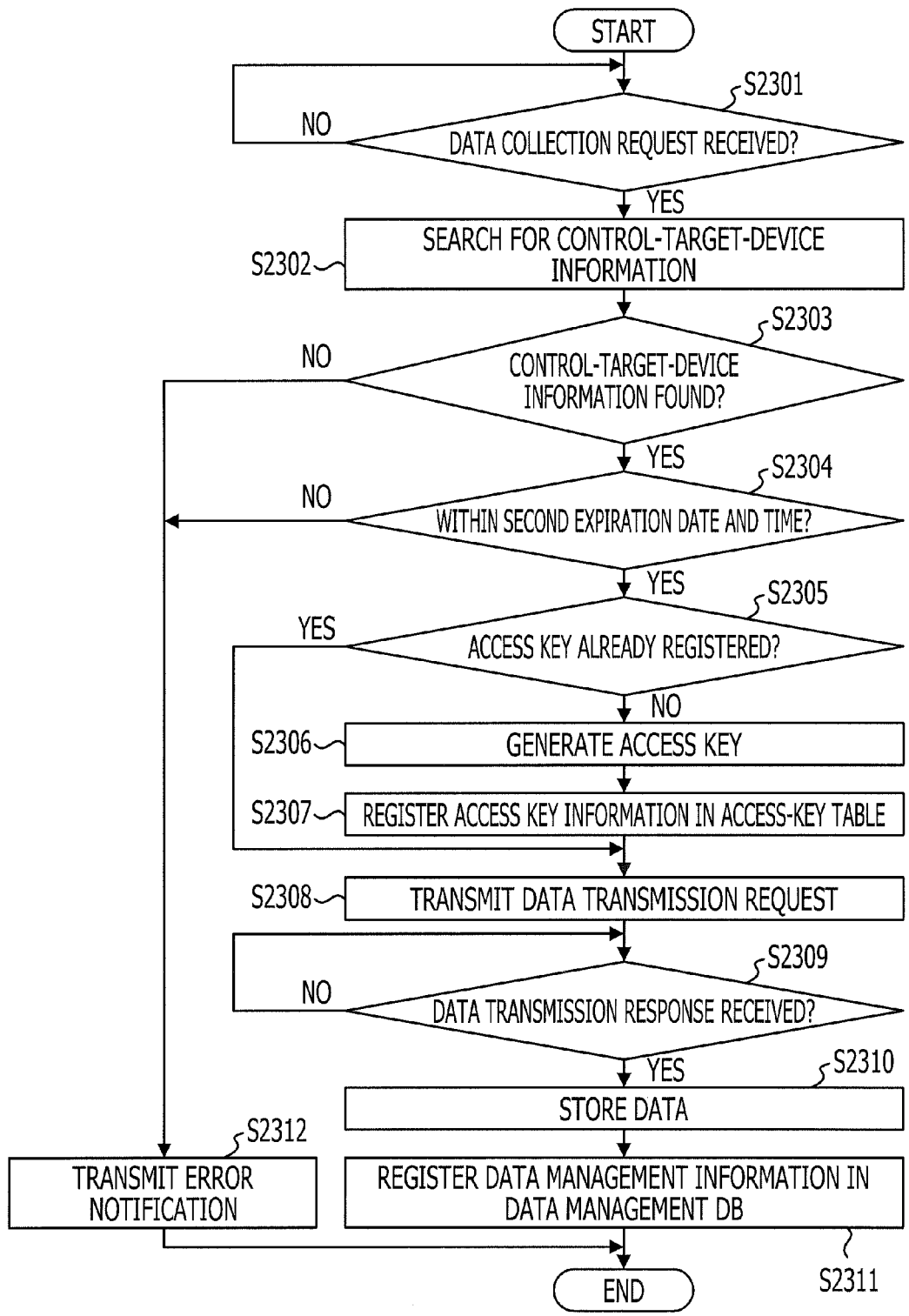
FIG. 23 is a flowchart illustrating an example of a collection processing procedure of the control server.

FIG. 23 is a flowchart illustrating an example of a collection processing procedure of the control server 201.

In S2301, the CPU 301 determines whether or not a collection request for collecting data resulted from measurement performed by the control-target device 203 is received from the gateway apparatus 202.

In this case, the CPU 301 waits for the data collection request to be received (No in S2301).

In S2302, when the data collection request is received (Yes in S2301), the CPU 301 searches the control-target-device management DB 250 for control-target-device information indicating the gateway ID contained in the data collection request.

In S2303, the CPU 301 determines whether or not the control-target-device information is found.

In S2304, when the control-target-device information is found (Yes in S2303), the CPU 301 determines whether or not the reception date and time of the data collection request is before the second expiration date and time indicated by the control-target-device information.

In S2305, when the reception date and time of the data collection request is before the second expiration date and time (Yes in S2304), the CPU 301 determines whether or not an access key is already registered in the access-key table 260 in association with the gateway ID contained in the data collection request. When the access key is already registered (Yes in S2305), the process proceeds to S2308.

In S2306, when the access key is not yet registered (No in S2305), the CPU 301 generates an access key unique to the gateway apparatus 202 that is the transmission source of the data collection request.

In S2307, the CPU 301 registers new access-key information in the access-key table 260.

In S2308, the CPU 301 transmits a data transmission request to the gateway apparatus 202 that is the transmission source of the data collection request.

In S2309, the CPU 301 determines whether or not a data transmission response is received. In this case, the CPU 301 waits for the data transmission response to be received (No in S2309).

In S2310, when the data transmission response is received (Yes in S2309), the CPU 301 stores the data contained in the data transmission response in a storage device, such as the RAM 303, the magnetic disk 305, or the optical disk 307.

In S2311, the CPU 301 registers new data management information in the data management DB 270. Thereafter, the series of processing illustrated in the flowchart ends.

In S2312, when the control-target-device information is not found (No in S2303), the CPU 301 transmits an error notification to the gateway apparatus 202. Thereafter, the series of processing illustrated in the flowchart ends. When the reception date and time of the data collection request is not before the second expiration date and time (No in S2304), the process proceeds to S2312.

As a result of the processing described above, the data resulted from measurement performed by the control-target device 203 that uses the gateway apparatus 202 as the relay apparatus may be collected in association with the access key unique to the gateway apparatus 202. When the error notification is transmitted to the gateway apparatus 202, the gateway apparatus 202 may re-transmit, to the control-target device 203, an initiation request for initiating the registration-key issuance request processing. With this arrangement, the processing may be restarted from the registration-key issuance request processing.

Determination Processing Procedure of Gateway Apparatus 202

Next, a description will be given of a determination processing procedure, performed by the gateway apparatus 202, for determining whether or not the registration period for the relay apparatus, which is indicated by the second expiration date and time, has expired. This determination processing is executed periodically for every certain period of time (e.g., one day or one week).

Figure 24:
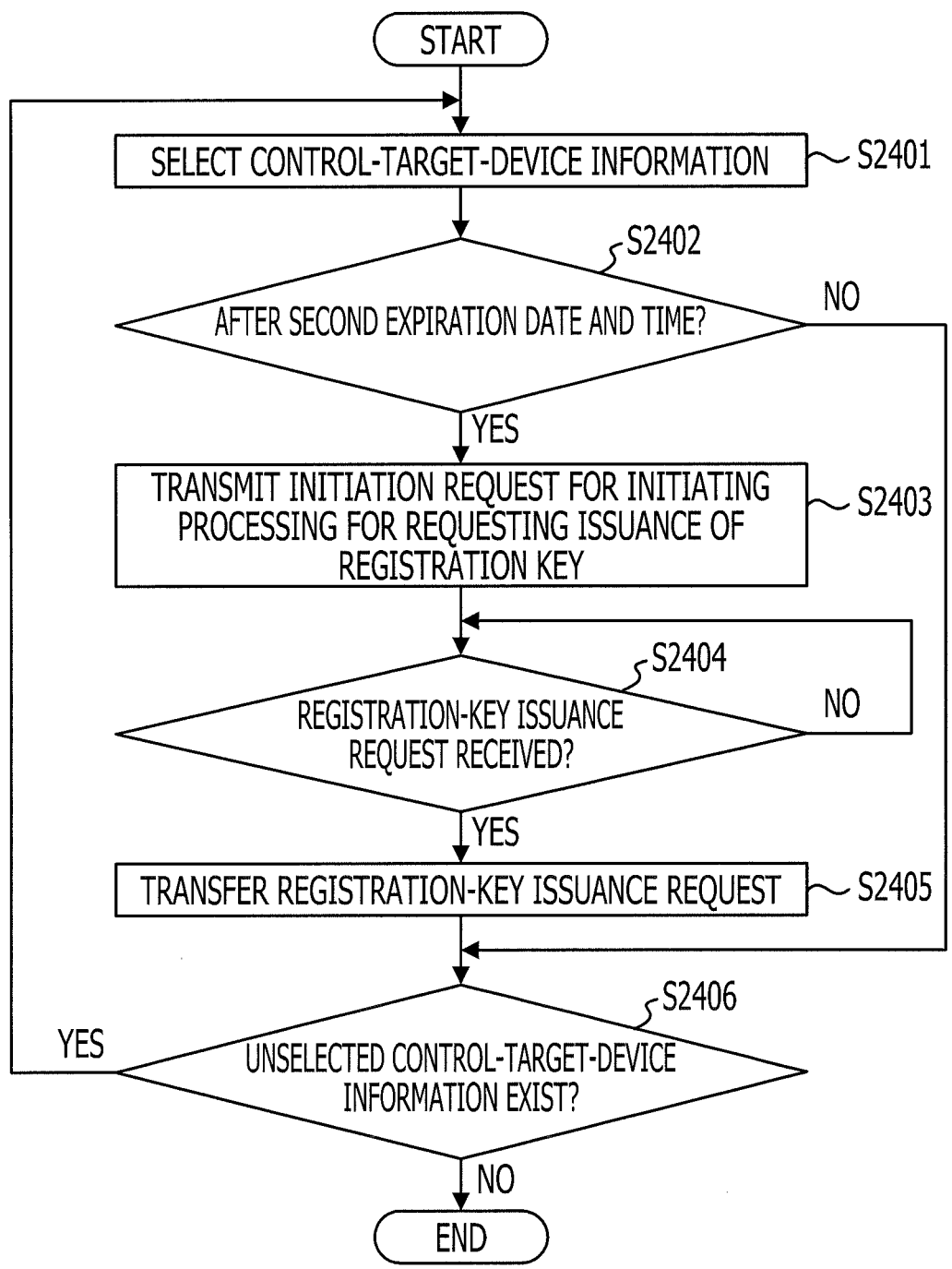
FIG. 24 is a flowchart illustrating an example of a determination processing procedure of the gateway apparatus.

FIG. 24 is a flowchart illustrating an example of a determination processing procedure of the gateway apparatus 202.

In S2401, the CPU 401 selects one of the pieces of control-target-device information stored in the control-target-device management local DB 280.

In S2402, the CPU 401 determines whether or not the current time is after the second expiration date and time indicated by the selected control-target-device information. When the current time is not after the second expiration date and time (No in S2402), the process proceeds to S2406.

In S2403, when the current time is after the second expiration date and time (Yes in S2402), the CPU 401 transmits, to the local IP address indicated by the control-target-device information, an initiation request for initiating processing for requesting issuance of a registration key unique to the control-target device 203.

In S2404, the CPU 401 determines whether or not a registration-key issuance request is received from the control-target device 203.

In this example, the CPU 401 waits for a registration-key issuance request to be received (No in S2404).

In S2405, when a registration-key issuance request is received (Yes in S2404), the CPU 401 transfers the registration-key issuance request to the control server 201.

In S2406, the CPU 401 determines whether or not an unselected piece of control-target-device information exists in the control-target-device management local DB 280. When any unselected control-target-device information exists (Yes in S2406), the process returns to S2401. On the other hand, when no unselected control-target-device information exists (No in S2406), the series of processing illustrated in the flowchart ends.

This arrangement may allows the control-target device 203 to re-transmit, when the registration period in which the gateway apparatus 202 is registered as the relay apparatus expires, a registration-key issuance request so as to request the control server 201 to perform the relay-apparatus registration again.

Application Examples of Registration Method

Next, descriptions will be given of application examples of the registration method according to the present embodiment. First, a description will be given of a case in which the control server 201 according to the present embodiment is applied to a management server for a remote-management portal site.

Figure 25:
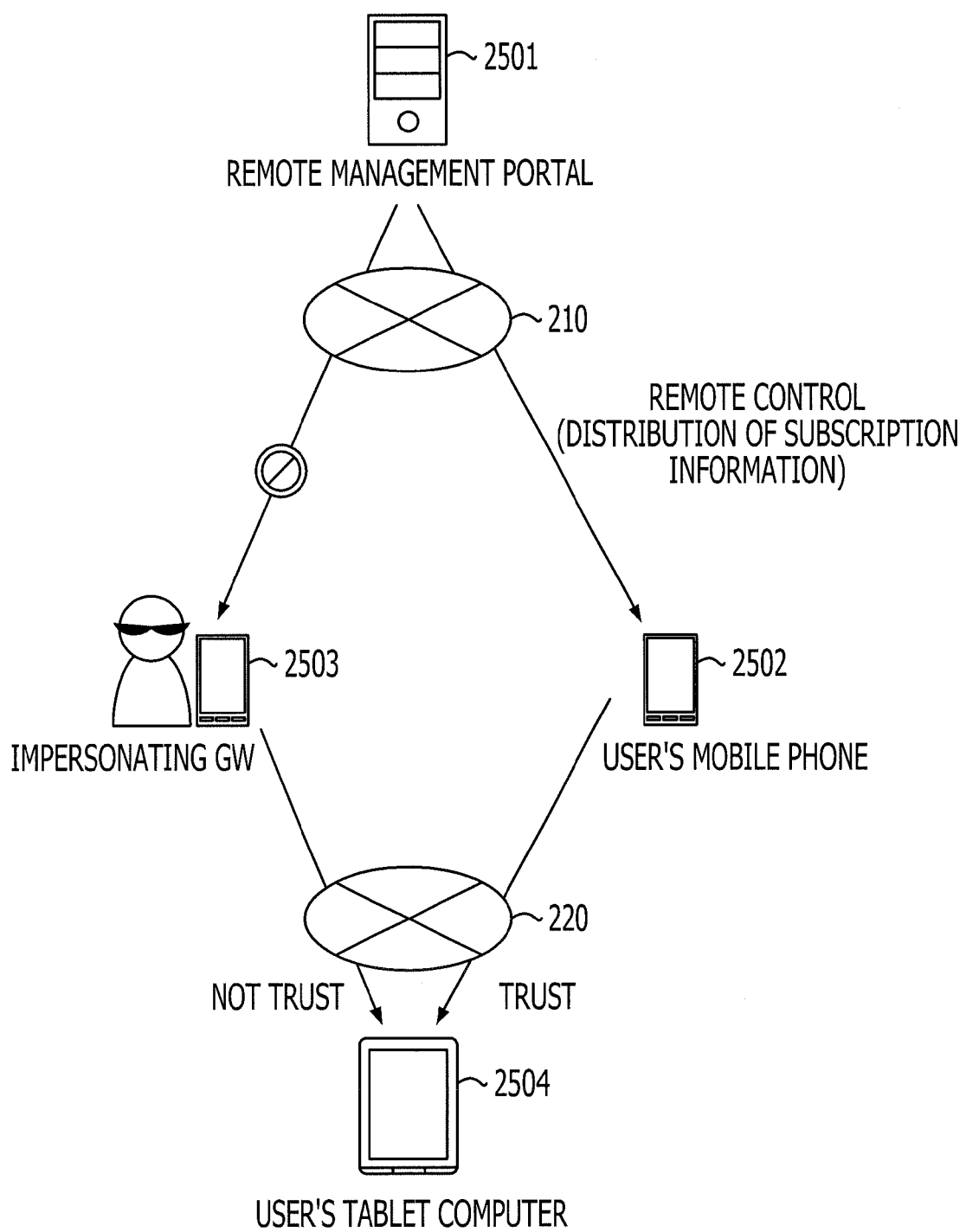
FIG. 25 illustrates an application example of the registration method.

FIG. 25 illustrates a first application example of the registration method. In FIG. 25, a management server 2501 may communicate with gateway apparatuses 2502 and 2503 through a network 210. Each of the gateway apparatuses 2502 and 2503 may also communicate with a control-target device 2504 through a network 220.

The gateway apparatuses 2502 and 2503 may be mobile phones. The gateway apparatus 2502 corresponds to the gateway apparatus 202 described above. The control-target device 2504 may be a tablet computer and corresponds to the control-target device 203 described above. The control-target device 2504 is, for example, equipment remotely maintained through wireless LAN connection.

The gateway apparatus 2502 is registered as the relay apparatus for relaying communication between the management server 2501 and the control-target device 2504. The gateway apparatus 2503, on the other hand, is not registered as the relay apparatus for relaying communication between the management server 2501 and the control-target device 2504.

It is now assumed that the management server 2501 distributes subscription information to the control-target device 2504. In this case, the management server 2501 may transmit the subscription information to the control-target device 2504 via the gateway apparatus 2502 that is registered in the control-target-device management DB 250 as the relay apparatus.

On the other hand, since the gateway apparatus 2503 is not registered as the relay apparatus, no subscription information may be transmitted from the management server 2501 to the gateway apparatus 2503. This arrangement may significantly reduce, for example, the possibility that a user who uses the gateway apparatus 2503 fraudulently acquires the subscription information distributed to the control-target device 2504.

In addition, since the control-target device 2504 communicates with only the gateway apparatus 2502 registered as the relay apparatus, it is possible to significantly reduce the possibility of unauthorized access to the control-target device 2504 and the possibility of leakage of various types of data resulted from measurement performed by the control-target device 2504.

Next, a description will be given of a case in which the control server 201 according to the present embodiment is applied to a management server for a health-management portal site.

Figure 26:
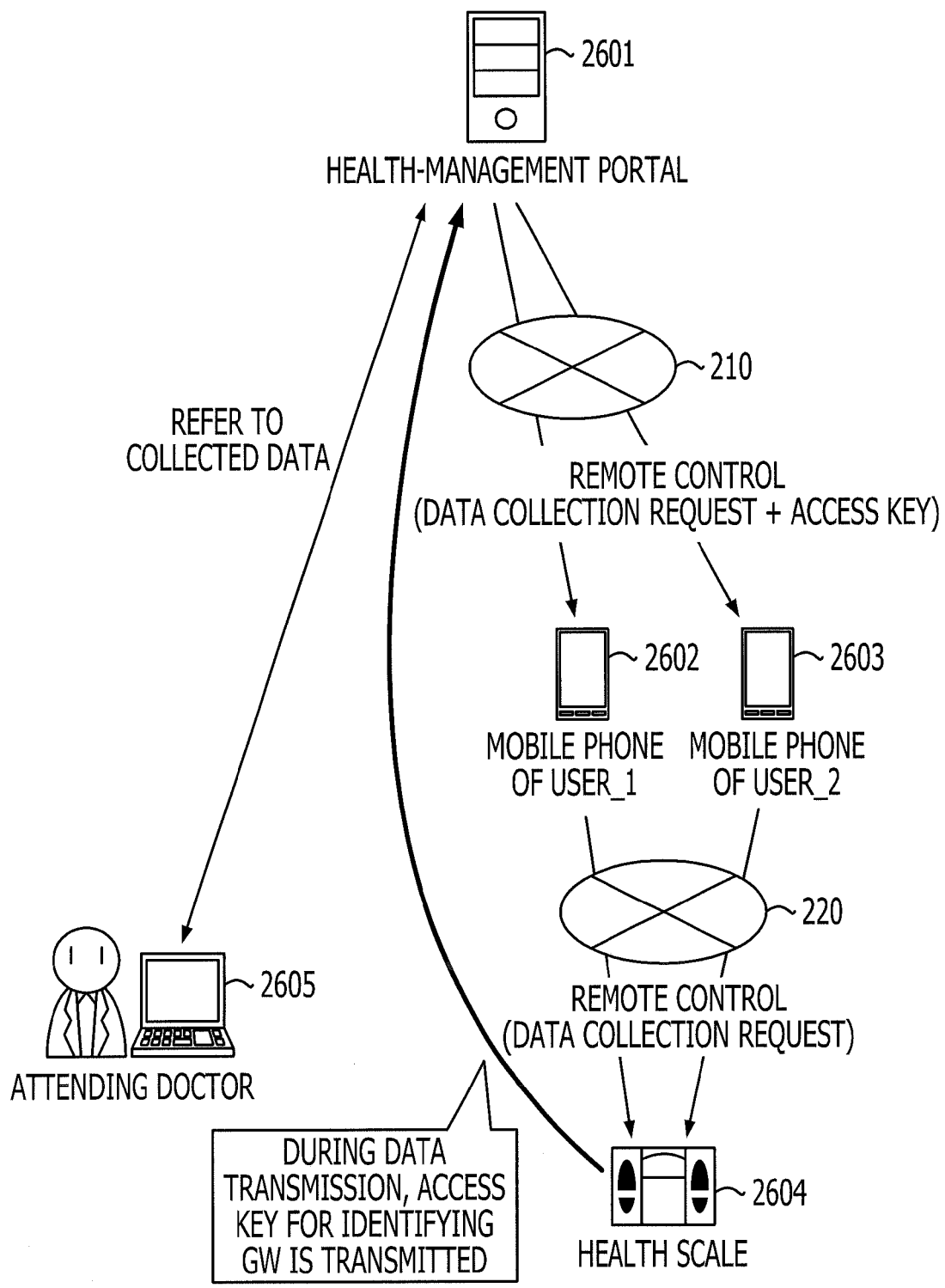
FIG. 26 illustrates an application example of the registration method.

FIG. 26 illustrates a second application example of the registration method. In FIG. 26, a management server 2601 may communicate with gateway apparatuses 2602 and 2603 through a network 210. Each of the gateway apparatuses 2602 and 2603 may also communicate with a control-target device 2604 through a network 220.

The gateway apparatuses 2602 and 2603 may be mobile phones and correspond to the gateway apparatuses 202 described above. Each of the gateway apparatuses 2602 and 2603 is registered as the relay apparatus for relaying communication between the management server 2601 and the control-target device 2604.

The control-target device 2604 may be a health scale and corresponds to the control-target device 203 described above. The control-target device 2604 is a non-dedicated health equipment used, for example, by both a user (user_1) of the gateway apparatus 2602 and a user (user_2) of the gateway apparatus 2603.

In this case, it is assumed that the management server 2601 collects body-weight data from the control-target device 2604.

It is first assumed that, as a result of measurement of the body weight of user_1 by using the control-target device 2604, a data collection request is transmitted from the gateway apparatus 2602 to the management server 2601. In this case, a data transmission request containing an access key for the gateway apparatus 2602 is transmitted from the management server 2601 to the control-target device 2604 via the gateway apparatus 2602. As a result, the body weight data to which the access key for the gateway apparatus 2602 is attached is transmitted from the control-target device 2604 to the management server 2601 via the gateway apparatus 2602.

Next, it is assumed that, as a result of the measurement of the body weight of user_2 by using the control-target device 2604, a data collection request is transmitted from the gateway apparatus 2603 to the management server 2601. In this case, a data transmission request containing an access key for the gateway apparatus 2603 is transmitted from the management server 2601 to the control-target device 2604 via the gateway apparatus 2603. As a result, the body weight data to which the access key for the gateway apparatus 2603 is attached is transmitted from the control-target device 2604 to the management server 2601 via the gateway apparatus 2603.

Thus, the body weight data of user_1 and user_2 may be collected from the control-target device 2604, which is shared by user_1 and user_2, via the gateway apparatuses 2602 and 2603 used by user_1 and user_2 respectively. As a result, it is possible to perform personal-information management taking privacy into account. For example, when an attending doctor accesses the management server 2601 by using a PC 2605 to refer to data collected from the control-target device 2604, only the body weight data of a user (e.g., user_1) taken care of by the attending doctor may be displayed.

As described above, according to the present embodiment, the control server 201 may receive an issuance request for issuing a registration key unique to the control-target device 203 from the control-target device 203 via the gateway apparatus 202. Upon reception of the registration-key issuance request, the control server 201 may generate a registration key unique to the control-target device 203 and may store the generated registration key in association with the IP address of the gateway apparatus 202 that is the transmission source of the registration-key issuance request.

As a result of the transmission of the registration key to the control-target device 203, the control server 201 may receive a registration request for registering a relay apparatus for relaying communication between the control server 201 and the control-target device 203 from the gateway apparatus 202. When the IP address of the gateway apparatus 202 that is the transmission source of the relay-apparatus registration request and any IP address stored in association with the registration key contained in the relay-apparatus registration request match each other, the control server 201 may register the gateway apparatus 202 as the relay apparatus.

With this arrangement, the gateway apparatus 202 that is the transmission source of the relay-apparatus registration request may be registered as the relay apparatus, provided that the source address of the registration-key issuance request and the source address of the relay-apparatus registration request match each other. Additionally, since the control-target device 203 does not execute complicated processing, for example, using a cryptographic technology in order to authenticate the gateway apparatus 202, the configuration of the control-target device 203 may be simplified.

Upon reception of the registration-key issuance request, the control server 201 may determine whether the registration PW stored in the registration-PW management DB 230 in association with the control-target-device ID contained in the registration-key issuance request matches the registration PW contained in the registration-key issuance request. When the registration PWs match each other, the control server 201 may generate a registration key unique to the control-target device 203. Thus, the gateway apparatus 202 that is the transmission source of the registration-key issuance request may be authenticated as an authentic apparatus requested by the control-target device 203 so as to relay the registration-key issuance request.

The control server 201 may set a first expiration date and time for the registration key unique to the control-target device 203. This arrangement allows limiting the validity of a pair of the registration key and the IP address, thus making it possible to significantly reduce the possibility that multiple registration keys are associated with a single IP address.

Upon reception of a data collection request from the gateway apparatus 202 registered as the relay apparatus, the control server 201 may generate an access key unique to the gateway apparatus 202 and store the generated access key in association with the gateway ID. The control server 201 may receive data to which the access key for the gateway apparatus 202 is attached from the gateway apparatus 202 as a result of transmission of a data transmission request containing the access key for the gateway apparatus 202 to the gateway apparatus 202.

Thus, data collected from the control-target device 203 via the gateway apparatuses 202 used by the users may be managed in association with the access keys for the gateway apparatuses 202. As a result, even when the control-target device 203 is used by multiple users, data of the respective users may be independently managed and thus personal-information management taking privacy into account may be performed.

The registration method described in the above embodiment may be realized by causing a computer, such as a PC or a workstation, to execute a prepared program. A registration program may be recorded to a computer-readable recording medium, such as a hard disk, a flexible disk, a CD-ROM (compact disc read-only memory), an MO (magneto optical disk), a DVD (digital versatile disc), or the like, and the computer may read the registration program therefrom to execute the registration program. The registration program may also be distributed through a network, such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A registration method executed by a computer, the registration method comprising:
receiving, from a target device via a communication apparatus that is capable of accessing the target device, an issuance request for issuing key information unique to the target device;
at each time of receiving the issuance request, generating, by the computer, a key value as the key information which is different from any other key values that are currently stored as the key information for other communication apparatuses by the computer;
storing a first address allocated to the communication apparatus via which the issuance request has been received, in association with the generated key value;
transmitting the generated key value to the target device via the communication apparatus;
receiving a registration request including the key value from the communication apparatus after the transmission of the generated key value to the target device, the registration request including a second address which is the address of the communication apparatus as a transmission source of the registration request; and when the second address is identical with the first address associated with the generated and stored key value, registering the communication apparatus as a relay apparatus for relaying communication between the computer and the target device.

2. The registration method according to claim 1, wherein, in the receiving the registration request and the key information, the computer receives the registration request including the key information from the communication apparatus in response to the transmission of the key information from the target device to the communication apparatus.

3. The registration method according to claim 1, wherein the issuance request contains identification information of the target device and authentication data for authenticating the target device, and a storage unit stores identification information of each target device and authentication data unique to each target device in association with each other, the registration method further comprising:
determining, upon reception of the issuance request, whether or not authentication data stored in the storage unit in association with the identification information contained in the issuance request matches the authentication data contained in the issuance request, wherein
in the generating the key information, the computer generates the key information when the authentication data stored in the storage unit matches the authentication data contained in the issuance request.

4. The registration method according to claim 1, further comprising:
generating access-key information for a transmission request that requests transmission of data output from the target device and is unique to other transmission requests via the communication apparatus when the communication apparatus is registered as the relay apparatus;

storing identification information of the communication apparatus and the generated access-key information at the computer and the target device;

transmitting, to the target device via the communication apparatus, the access-key information unique to the communication apparatus and the transmission request for transmitting data output from the target device;

receiving the data attached with the access-key information in response to the transmission of the transmission request; and storing the received data and relevant information derived from the access-key information in association with each other.

5. The registration method according to claim 1, further comprising:
setting a valid period for the key information unique to the target device, wherein in the registering the communication apparatus as the relay apparatus, the computer registers the communication apparatus as the relay apparatus when the registration request including the key information is received within the valid period and when said second address and said first address stored in association with the received key information match each other.

6. A non-transitory computer-readable recording medium storing a program that causes a computer to execute a procedure, the procedure comprising:
receiving, from a target device via a communication apparatus that is capable of accessing the target device, an issuance request for issuing key information unique to the target device;

at each time of receiving the issuance request, generating a key value as the key information which is different from any other key values that are currently stored as the key information by the computer;

storing a first address allocated to the communication apparatus via which the issuance request has been received, in association with the generated key value;

transmitting the generated key value to the target device via the communication apparatus;

receiving a registration request and including the key value from the communication apparatus after the transmission of the generated key value, the registration request including the address of the communication apparatus as the transmission source of the registration request; and when the address of transmission source of the registration request is identical with the first address associated with the generated and stored key value, registering the communication apparatus as a relay apparatus for relaying communication between the computer and the target device.

7. A registration apparatus comprising:
a processor to:
receive, from a target device via a communication apparatus that is capable of accessing the target device, an issuance request for issuing key information unique to the target device;

generate, at each time of receiving the issuance request, a key value as the key information which is different from any other key values that are currently stored as the key information by the computer;

store a first address allocated to the communication apparatus via which the issuance request has been received, in association with the generated key value;

transmit the key value to the target device via the communication apparatus;

receive a registration request including the key value from the communication apparatus after the transmission of the key value, the registration request including the address of the communication apparatus as the transmission source of the registration request; and register, when the second address is identical with the first address associated with the generated and stored key value, the communication apparatus as a relay apparatus for relaying communication between the computer and the target device; and a memory coupled to the processor, the memory being configured to store information on a communication apparatus in association with the key information.

* * * * *

UNITED STATES PATENT AND TRADEMARK OFFICE
CERTIFICATE OF CORRECTION

PATENT NO.        : 9,100,244 B2                    Page 1 of 1
APPLICATION NO.   : 13/609432
DATED             : August 4, 2015
INVENTOR(S)       : Shingo Fujimoto et al.

It is certified that error appears in the above-identified patent and that said Letters Patent is hereby corrected as shown below:

In the claims,

Claim 6, Column 30, Line 21

After "request" delete "and".

Signed and Sealed this
Twenty-fourth Day of November, 2015

Michelle K. Lee
*Director of the United States Patent and Trademark Office*